US012321700B2

(12) United States Patent
Akbari et al.

(10) Patent No.: US 12,321,700 B2
(45) Date of Patent: *Jun. 3, 2025

(54) METHODS, SYSTEMS, AND MEDIA FOR BI-MODAL GENERATION OF NATURAL LANGUAGES AND NEURAL ARCHITECTURES

(71) Applicants: Mohammad Akbari, Coquitlam (CA); Amin Banitalebi Dehkordi, Vancouver (CA); Behnam Kamranian, North Vancouver (CA); Yong Zhang, Richmond (CA)

(72) Inventors: Mohammad Akbari, Coquitlam (CA); Amin Banitalebi Dehkordi, Vancouver (CA); Behnam Kamranian, North Vancouver (CA); Yong Zhang, Richmond (CA)

(73) Assignee: HUAWEI CLOUD COMPUTING TECHNOLOGIES CO., LTD., Gui'An New District (CN)

(*) Notice: Subject to any disclaimer, the term of this patent is extended or adjusted under 35 U.S.C. 154(b) by 260 days.

This patent is subject to a terminal disclaimer.

(21) Appl. No.: 17/877,705

(22) Filed: Jul. 29, 2022

(65) Prior Publication Data
US 2024/0037335 A1     Feb. 1, 2024

(51) Int. Cl.
*G06F 40/284*      (2020.01)
*G06N 3/045*       (2023.01)

(52) U.S. Cl.
CPC .......... *G06F 40/284* (2020.01); *G06N 3/045* (2023.01)

(58) Field of Classification Search
CPC .............................. G06F 40/284; G06N 3/045
See application file for complete search history.

(56) References Cited

U.S. PATENT DOCUMENTS

| 2019/0236135 A1* | 8/2019 | Tyamagondlu Nagabhushan ....... G06N 3/08 |
| 2020/0311345 A1* | 10/2020 | Patel ....................... G06F 40/30 |
| 2020/0372217 A1* | 11/2020 | Abuammar .............. G06N 3/08 |
| 2022/0382976 A1* | 12/2022 | Shin ........................ G06N 3/04 |

OTHER PUBLICATIONS

Siolas, Graph based Neural Architecture Search with Operation Embeddings, IEEE, 2021, whole document (Year: 2021).*
VideoBERT: Sun C, Myers A, Vondrick C, Murphy K, Schmid C. Videobert: A joint model for video and language representation learning. In Proceedings of the IEEE/CVF International Conference on Computer Vision (pp. 7464-7473). 2019.

(Continued)

*Primary Examiner* — Sonia L Gay

(57) ABSTRACT

Methods, systems, and computer-readable media for bi-modal generation of natural language (NL) and artificial neural network architectures (NA), with reference to an example implementation framework entitled "ArchGen-BERT". A model and method of training the model for bi-modal generation of NL and NA are described. The model trained for bi-modal generation of NL and NA can be deployed to perform a number of useful tasks to assist with designing, describing, translating, and modifying neural network architectures.

18 Claims, 12 Drawing Sheets

(56) References Cited

OTHER PUBLICATIONS

CodeBERT: Feng Z, Guo D, Tang D, Duan N, Feng X, Gong M, Shou L, Qin B, Liu T, Jiang D, Zhou M. CodeBERT: A Pre-Trained Model for Programming and Natural Languages. In Findings of the Association for Computational Linguistics: EMNLP (pp. 1536-1547). Nov. 2020.

GraphCodeBERT: Guo D, Ren S, Lu S, Feng Z, Tang D, Liu S, Zhou L, Duan N, Svyatkovskiy A, Fu S, Tufano M. GraphCodeBERT: Pre-training Code Representations with Data Flow. In ICLR Jan. 1, 2021.

Bossnas: Li C, Tang T, Wang G, Peng J, Wang B, Liang X, Chang X. Bossnas: Exploring hybrid cnn-transformers with block-wisely self-supervised neural architecture search. InProceedings of the IEEE/CVF International Conference on Computer Vision (pp. 12281-12291). 2021.

Attentivenas: Wang D, Li M, Gong C, Chandra V. Attentivenas: Improving neural architecture search via attentive sampling. InProceedings of the IEEE/CVF Conference on Computer Vision and Pattern Recognition (pp. 6418-6427). 2021.

\* cited by examiner

METHODS, SYSTEMS, AND MEDIA FOR BI-MODAL GENERATION OF NATURAL LANGUAGES AND NEURAL ARCHITECTURES

FIELD

The present disclosure relates to bi-modal machine learning, including bi-modal generation of natural language and artificial neural network architectures.

BACKGROUND

Inference tasks performed by machine learning models fall generally into two categories: discriminative tasks and generative tasks, performed by discriminative models and generative models respectively. Discriminative models involve drawing boundaries in a data space and predicting the labels of input data. On the other hand, generative models focus on generating data examples and instances that plausibly come from an existing distribution of samples.

Most existing machine learning techniques are based on uni-modal learning, where only a single modality (i.e., a single type of data or datatype) is used as input for learning an inference task to be performed by a machine learning model. For example, an image generative model designed for randomly generating new plausible photographs (e.g., of human faces, flowers, etc.) is typically trained using only images as data samples for training. Similarly, a language generation model is typically trained using only text data samples. Despite the success of existing uni-modal learning techniques, they are insufficient to model some aspects of human generative behavior or to produce plausible generative outputs.

However, as generative models become more and more successful at traditional uni-modal tasks, there are also many new challenges that concern multi-modality, wherein models simultaneously learn from multiple modes (e.g., images and text) to yield richer, more abstract, and more generalizable representations. As an example, text-based image generation aims to generate photo-realistic images which are semantically consistent with a given textual description.

Some efforts have been made to address this problem by using multi-modal learning, wherein a model is configured and trained to jointly learn from multiple modalities of input data, such as two or more of: audio, video, image, text, etc. These approaches seek to impart to the model a better understanding of various senses (i.e. sensory modalities) in information processing. Some such approaches provide the possibility of supplying a missing modality based on the observed ones (e.g., using a trained model to generate captions or textual description for a given input image).

One popular approach to multi-modal machine learning is the use of multi-modal language models, wherein an extra modality (e.g., image or video) is jointly used as training data and learned along with the use of natural language data (typically text data) as training data. Some of the most recent multi-modal language models include VideoBERT (trained using video and text data), CodeBERT (trained using software code and text data), and GraphCodeBERT (trained using software code and text data, and also considers the inherent structure of the software code).

Outside of the field of multi-modal machine learning, some efforts have been made to build tools to assist in the design of artificial neural networks. Some of these tools leverage machine learning techniques to select an architecture for an artificial neural network that would be well suited to perform a specific inference task on a specific dataset. In particular, the field of neural architecture search (NAS) seeks to automate parts of the design process for artificial neural networks by processing an input dataset and identifying a neural network architecture (NA) that is likely to perform a given inference task on the dataset effectively after being trained. Some example NAS models are BossNAS and AttentiveNAS.

However, NAS exhibits a number of limitations. Existing NAS approaches are limited to the selection of NAs for performing classification tasks (as opposed to other inference task types) on image data (as opposed to other modalities). NAS requires a dataset to be used as input, and its performance is limited to that specific dataset. NAS is extremely computationally complex, because it needs to be re-trained for each individual dataset and classification task. Furthermore, NAS can only perform a single function, namely the identification of a suitable NA for a given classification task on a given image dataset; the understanding of the trained model used for NAS cannot be leveraged to perform other useful related tasks. In particular, NAS does not have an understanding of natural language, and is not a generative language model.

The design of artificial neural networks is an extremely complex and important topic in the field of machine learning. Artificial neural networks are computational structures used for predictive modelling. A neural network typically includes multiple layers of neurons, each neuron receiving inputs from a previous layer, applying a set of weights to the inputs, and combining these weighted inputs to generate an output, which is in turn provided as input to one or more neurons of a subsequent layer. The output of a neural network is typically an inference performed with respect to the input data. An example of an inference task is classification, in which an input data sample is inferred to belong to one of a plurality of classes or categories.

A neural network is typically defined by its network architecture (NA), and by a current state of the learnable parameters (i.e., weights) of the network that define its behavior at a given stage of its training. The NA is typically defined by a graph and a set of hyperparameters (as distinct from the learnable parameters). The graph contains nodes corresponding to the neurons, and edges corresponding to the connections between the neurons. The hyperparameters define any behaviors or characteristics of the network other than its graph structure and weight values: for example, hyperparameters may define the operation of a training procedure when the network is in a training mode, as well as operation of an inference procedure when the network is in an inference mode.

Thus, there exists a need for a technique for generation of artificial neural network architectures and natural language that overcomes one or more of the shortcomings of the existing approaches described above.

SUMMARY

In various examples, the present disclosure describes methods, systems, and computer-readable media for bi-modal generation of natural language (NL) and artificial neural network architectures. A model trained in bi-modal generation of NL and NA can be deployed to perform a number of useful tasks to assist with designing, describing, translating, and modifying neural network architectures.

Some embodiments described herein may thereby solve one or more technical problems. Methods and systems are provided for joint learning of NL and NA and their relations.

Example embodiments may provide a generative model trained with a bi-modal understanding of NL and NA for generative purposes, including NA answer generation in response to NL questions, text-based NA generation, architecture-based NL generation (e.g., NA captioning), NA translation, multi-modal NA translation assisted by NL information, NA completion, NA repair, and/or multi-modal NA completion or repair assisted by NL information. It will be appreciated that a generative bi-modal model trained for bi-modal generation of NL and NA may be deployed to solve additional technical problems related to the relationship between natural language and neural network architectures, and that the methods and systems described herein may overcome additional technical problems related to the design, training, and use of such a model.

Thus, various embodiments and examples described herein may provide:

- A system that is capable of joint learning of NAs and NLs for generative inference tasks, and is therefore applicable to different NL and NA generative inference tasks.
- A system that can generate natural language answers to natural language questions regarding neural network architectures.
- A system that can generate or design neural network architectures based on natural language descriptions.
- A system that can generate natural language descriptions (e.g., captions, labels, or tags) based on neural network architectures.
- A system that can translate a first neural network architecture type to a second type (e.g., translate a Pytorch NA to a Tensorflow NA).
- A system that can translate a first neural network architecture type to a second type (e.g., translate a Pytorch NA to a Tensorflow NA) assisted by additional natural language information.
- A system that can predictively complete and/or repair an incomplete neural network architecture.
- A system that can predictively complete and/or repair an incomplete neural network architecture assisted by additional natural language information.
- A system that is dataset independent, in that no specific input dataset is required for performing the learning or inference tasks.
- A system that is datatype agnostic, in that it can support learning and inference related to neural network architectures designed for learning any type of data (image, video, audio, text, etc.).
- A system that is low complexity, in that it can perform generative tasks in a single inference, resulting in fast NL and NA generation services.
- A system that can perform time- and cost-efficient generative inference in response to a simple natural language query, with the potential to significantly improve usability, user engagement, user exploration, and user experience, especially for beginner and intermediate users and developers in the field of machine learning.
- A system that can be easily trained to support all natural languages, such as English, Chinese, French, etc., potentially making the system's services accessible in different languages and different countries.
- A system that can output trainable and usable neural network architectures, which can be used directly by different types of users (including beginners) for performing machine learning tasks.

As used herein, the term "model" may refer to a mathematical or computational model. A model may be said to be implemented, embodied, run, or executed by an algorithm, computer program, or computational structure or device. In the present example embodiments, unless otherwise specified a model refers to a "machine learning model", i.e., a predictive model intended to model human understanding of input such as language, implemented by an algorithm trained using deep learning or other machine learning techniques, such as a deep neural network (DNN).

As used herein, the term "neural network" may refer to an artificial neural network, which is a computational structure used to implement a model. A neural network is defined by a "network architecture" (NA), which typically includes a graph structure consisting of nodes (i.e. neurons) and edges (i.e. connections between neurons) as well as a set of hyperparameters defining the operation of the neural network during training and/or during performance of an inference task for which the neural network has been trained. The terms network, neural network, artificial neural network, and network may be used interchangeably herein unless indicated otherwise. The terms "artificial neural network architecture", "neural network architecture", "network architecture", and "architecture" are used interchangeably herein unless indicated otherwise.

As used herein, the term "machine learning" (ML) may refer to a type of artificial intelligence that makes it possible for software programs to become more accurate at making predictions without explicitly programming them to do so.

As used herein, the term "image classification" may refer to categorizing and/or labeling images.

An "input sample" may refer to any data sample used as an input to a neural network, such as image data. It may refer to a training data sample used to train a neural network, or to a data sample provided to a trained neural network which will infer (i.e. predict) an output based on the data sample for the task for which the neural network has been trained. Thus, for a neural network that performs a task of image classification, an input sample may be a single digital image.

As used herein, the term "transformer" may refer to a machine learning model that adopts the mechanism of self-attention and weights each part of the input data differentially. Computer vision and natural language processing are the two areas in which transformers are most widely used.

As used herein, the term "BERT" is an acronym for Bidirectional Encoder Representations from Transformers. BERT is a deep learning model based on transformers, wherein every output element is related to every input element and weightings between the elements are dynamically calculated based on their connection.

As used herein, the term "encoder" may refer to a functional module for performing a process, encoding, by which a set of data is converted to a specialized format for efficient transmission or storage. In neural networks, encoders represent generic models that are able to generate a specific type of representation from input data.

As used herein, the term "decoder" may refer to a functional module for converting encoded data (i.e., data generated by an encoder) into the original data type or format corresponding to the original set of data.

As used herein, the term "auto-encoder" may refer to a type of feedforward neural network wherein the input information is the same as the output information. An auto-encoder may encode the input information into a lower-dimensional representation using an encoder, and then use a decoder to process this representation, thereby reconstructing the input information as the output information of the decoder.

As used herein, the term "embedder" may refer to a functional module for performing a process, embedding, used to simplify machine learning for large inputs. An example of embedding is generating sparse vectors representing words.

As used herein, the term "computational graph" (or simply "graph" if not otherwise specified) may refer to a directed graph in which the nodes represent mathematical operations. In mathematics, computational graphs can be used to express and evaluate neural network architectures and machine learning models.

As used herein, the term "directed acyclic graph" may refer to a graph whose edges are connected without cycles. This means that starting at one edge, there is no way to traverse the entire graph.

As used herein, the term "binary adjacency matrix" may refer to a graph represented by an adjacency matrix as a set of Boolean values (0's and 1's), wherein the Boolean values of the matrix indicate whether there is a direct path between any two nodes.

As used herein, the terms "graph attention network" or "GAT" may refer to a neural network architecture that is designed to work with graph-structured data, such as graph convolutions, but leverages self-attentional masking layers to improve performance.

As used herein, the term "fully-connected layer" may refer to those layers within a neural network wherein each activation unit of one layer is connected to every activation unit of a subsequent layer.

As used herein, the term "convolution" may refer to the process of applying a filter of a convolutional neural network layer to an input to produce an activation. When the same filter is applied to an input several times, a feature map may be created, displaying the positions and intensity of a recognized feature in an input, such as an image.

As used herein, the term "pooling" may refer to a technique used in convolutional neural networks to enable the network to recognize features regardless of their location in the input by generalizing information retrieved by convolutional filters.

As used herein, the term "cosine similarity" may refer to a measure of the similarity of two vectors in an inner product space. Cosine similarity determines whether two vectors are pointing in the same general direction by measuring the cosine of the angle between them. In text analysis and other natural language processing (NLP) contexts, cosine similarity is frequently used to determine the degree of similarity of two language samples (e.g., two documents).

As used herein, the term "semantic search" may refer to a data searching strategy in which a search query seeks to discover a set of keywords a person is searching for, relying in part on the intent and contextual meaning of the keywords.

As used herein, the term "database" may refer to a logically ordered collection of structured data kept electronically in a computer system.

As used herein, the term "training" may refer to a procedure in which an algorithm uses historical data to extract patterns from them and learn to distinguish those patterns in as yet unseen data. Machine learning uses training to generate a trained model capable of performing a specific inference task.

As used herein, the term "finetuning", "fine-tuning", or "fine tuning" may refer to making small adjustments to a process (e.g., small adjustment to the weight values of a neural network) in order to obtain an intended result or performance. In deep learning, the weights of a partially trained deep learning model are fine tuned to generate a fully trained deep learning model.

As used herein, the term "Pytorch" refers to an open source deep learning software framework. Typical use cases for Pytorch include applications such as image processing, computer vision, and natural language processing (NLP).

As used herein, the term "Tensorflow" refers to an open source software framework for machine learning, deep learning, and other statistical and predictive analytics procedures. Tensorflow is designed to ease the process of developing and executing complex analytics applications for users.

As used herein, the term "similarity" may refer to semantic similarity, as evaluated by a model trained with a bi-modal understanding of natural language and neural network architectures. By using semantic similarity to evaluate architectural information, natural language information, or a mix of architectures and natural language information, embodiments described herein may exhibit greater accuracy in the analysis of those features of a neural network that are salient to human language and linguistic reasoning and characterization, thereby potentially capturing and focusing on details that are important to human users and their goals.

As used herein, a statement that an element is "for" a particular purpose may mean that the element performs a certain function or is configured to carry out one or more particular steps or operations, as described herein.

As used herein, statements that a second element is "based on" a first element may mean that characteristics of the second element are affected or determined at least in part by characteristics of the first element. The first element may be considered an input to an operation or calculation, or a series of operations or computations, which produces the second element as an output that is not independent from the first element.

In some aspects, the present disclosure describes a method. A generative bi-modal model trained with a bi-modal understanding of natural language in relation to neural network architectures is obtained. Input information is provided to the model. The input information comprises at least one of the following: natural language information, and neural network architecture information. The model is used to encode the input information to generate encoded representations of the input information, and decode the encoded representations of the input information to generate output information comprising at least one of natural language information and neural network architecture information.

In some aspects, the present disclosure describes a method. Input information is obtained, comprising at least one of the following: natural language information, and neural network architecture information. The input information is transmitted to a system comprising a model trained with a bi-modal understanding of natural language in relation to neural network architectures. Output information generated by the model by processing the input information is received.

In some examples, the model comprises a text encoder to process natural language information to generate word embeddings, a neural network architecture encoder to process neural network architecture information to generate graph encodings, a cross transformer encoder to process word embeddings and graph encodings to generate joint embeddings, a cross transformer decoder to process joint embeddings to generate word embeddings and graph encodings, a neural network architecture decoder to process graph encodings to generate neural network architecture information, and a text decoder to process word embeddings to generate natural language information.

In some examples, the text encoder comprises a tokenizer to process natural language information to generate a sequence of tokens, and a word embedder to process the sequence of tokens to generate word embeddings.

In some examples, the neural network architecture encoder comprises a graph generator to process neural network architecture information to generate a graph comprising a plurality of nodes, a plurality of edges, and a plurality of shapes, a shape embedder to process the plurality of shapes to generate shape embeddings, a node embedder to process the plurality of nodes to generate node embeddings, a summation module to sum the shape embeddings and node embeddings to generate a shape-node summation, and a graph attention network (GAT) for processing the summation and the plurality of edges to generate a graph encoding.

In some examples, the text decoder comprises a word decoder to process word embeddings to generate a sequence of tokens, and a beam search module to process the sequence of tokens, using a beam search algorithm, to generate natural language information.

In some examples, the neural network architecture decoder comprises a graph attention network (GAT) decoder for processing graph encodings to generate a plurality of edges, a plurality of node embeddings, and a plurality of shape embeddings, a shape decoder to process the plurality of shape embeddings to generate a plurality of shapes, a node decoder to process the plurality of node embeddings to generate a plurality of nodes, and a network architecture generator to process the plurality of nodes, the plurality of edges, and the plurality of shapes to generate neural network architecture information.

In some examples, obtaining the model comprises a number of steps. A training dataset is provided, comprising a plurality of positive training samples, each positive training data sample comprising neural network architecture information associated with natural language information descriptive of the neural network architecture information. The model is trained, using supervised learning, to minimize a difference between the neural network architecture information and the natural language information of the positive training samples.

In some examples, the model further comprises a pooling module to pool the joint embeddings to generate encoded representations comprising fixed-size one-dimensional (1D) representations, and a similarity evaluator for processing encoded representations to determine a similarity measure using a cosine similarity metric. Obtaining the model comprises a number of steps. A training dataset is provided, comprising a plurality of positive training samples, each positive training data sample comprising neural network architecture information associated with natural language information descriptive of the neural network architecture information, and a plurality of negative training samples, each negative training data sample comprising neural network architecture information associated with natural language information not descriptive of the neural network architecture information. The text encoder and the neural network architecture encoder of the model are pre-trained, using supervised learning, to maximize a similarity measure generated between the neural network architecture information and the natural language information of the positive training samples, and minimize the similarity measure generated between the neural network architecture information and the natural language information of the negative training samples.

In some examples, the input information comprises natural language information comprising a question, and neural network architecture information corresponding to a first neural network architecture, and the output information comprises natural language information comprising an answer responsive to the question with respect to the first neural network architecture.

In some examples, obtaining the model comprises providing an additional training dataset comprising a plurality of additional training samples. Each additional training data sample comprises neural network architecture information corresponding to a neural network architecture, a first natural language data sample corresponding to a question, and a second natural language data sample corresponding to an answer to the question with respect to the neural network architecture of the neural network architecture information. The model is fine-tuned, using supervised learning, to associate, for each training data sample, the second natural language data sample with the neural network architecture information and the first natural language data sample.

In some examples, the input information comprises natural language information comprising a textual description descriptive of a first neural network architecture, and the output information comprises neural network architecture information corresponding to the first neural network architecture.

In some examples, the input information comprises neural network architecture information corresponding to a first neural network architecture, and the output information comprises natural language information comprising a textual description descriptive of the first neural network architecture.

In some examples, the input information comprises neural network architecture information corresponding to a first neural network architecture in a first domain, and the output information comprises neural network architecture information corresponding to the first neural network architecture in a second domain.

In some examples, obtaining the model comprises a number of steps. An additional training dataset is provided, comprising a plurality of additional training samples. Each additional training data sample comprises a first neural network architecture information data sample corresponding to a neural network architecture in the first domain, and a second neural network architecture information data sample corresponding to the neural network architecture in the second domain. The model is fine-tuned, using supervised learning, to associate, for each training data sample, the second neural network architecture information data sample with the first neural network architecture information data sample.

In some examples, the input information further comprises natural language information comprising a textual description. Using the model to process the input information to generate the output information further comprises processing the natural language information, using the model, to generate an encoded representation of the natural language information. The output information comprises neural network architecture information that corresponds to the first neural network architecture in a second domain, and is described by the textual description.

In some examples, the input information comprises neural network architecture information corresponding to an incomplete version of a first neural network architecture, and the output information comprises neural network architecture information corresponding to a complete version of the first neural network architecture.

In some examples, obtaining the model comprises a number of steps. An additional training dataset is provided, comprising a plurality of additional training samples. Each additional training data sample comprises a first neural network architecture information data sample corresponding to an incomplete version of a neural network architecture, and a second neural network architecture information data sample corresponding to a complete version of the neural network architecture. The model is fine-tuned, using supervised learning, to associate, for each training data sample, the second neural network architecture information data sample with the first neural network architecture information data sample.

In some examples, the input information further comprises natural language information comprising a textual description. Using the model to process the input information to generate the output information further comprises processing the natural language information, using the model, to generate an encoded representation of the natural language information. The output information comprises neural network architecture information that corresponds to a complete version of the first neural network architecture, and is described by the textual description.

In some aspects, the present disclosure describes a non-transitory computer-readable medium having instructions tangibly stored thereon that, when executed by a processing system, cause the processing system to perform one or more of the method steps described above.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Methods, systems, and computer-readable media for bi-modal generation of natural language (NL) and artificial neural network architectures (NA) will now be described with reference to example embodiments. In some examples, a model and method of training the model for bi-modal generation of NL and NA are described. In some examples, a model trained in bi-modal generation of NL and NA can be deployed to perform tasks such as processing NL to perform generative inference tasks relating to NA and/or NL, such as NA answer generation in response to NL questions, text-based NA generation, architecture-based NL generation (e.g., NA captioning), NA translation, multi-modal NA translation assisted by NL information, NA completion, NA repair, and/or multi-modal NA completion or repair assisted by NL information.

Example embodiments may be described herein with reference to an example implementation framework entitled "ArchGenBERT". ArchGenBERT may encompass a number of techniques for generating and deploying a model trained for bi-modal generation of NL and NA.

Example Computing System

A system or device, such as a computing system, that may be used in examples disclosed herein is first described.

Figure 1:
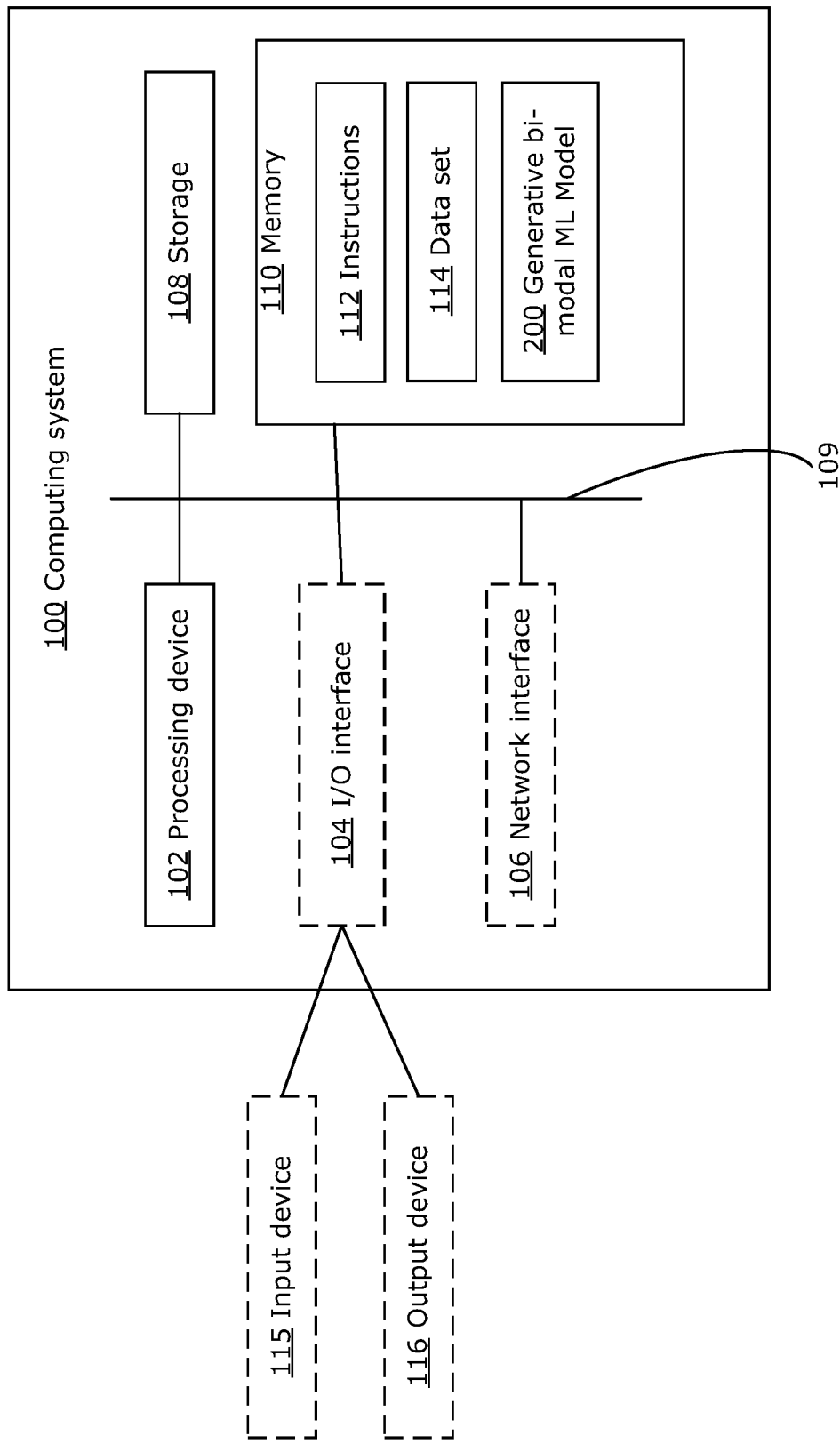
FIG. 1 is a block diagram of an example computing system that may be used to implement examples described herein.

FIG. 1 is a block diagram of an example simplified computing system 100, which may be a device that is used to execute instructions 112 in accordance with examples disclosed herein, including the instructions of a generative bi-modal machine learning model 200 trained to learn bi-modal generation of natural language (NL) and artificial neural network architectures (NA). Other computing systems suitable for implementing embodiments described in the present disclosure may be used, which may include components different from those discussed below. In some examples, the computing system 100 may be implemented across more than one physical hardware unit, such as in a parallel computing, distributed computing, virtual server, or cloud computing configuration. Although FIG. 1 shows a single instance of each component, there may be multiple instances of each component in the computing system 100.

The computing system 100 may include a processing system having one or more processing devices 102, such as a central processing unit (CPU) with a hardware accelerator, a graphics processing unit (GPU), a tensor processing unit (TPU), a neural processing unit (NPU), a microprocessor, an application-specific integrated circuit (ASIC), a field-programmable gate array (FPGA), a dedicated logic circuitry, a dedicated artificial intelligence processor unit, or combinations thereof.

The computing system 100 may also include one or more optional input/output (I/O) interfaces 104, which may enable interfacing with one or more optional input devices 115 and/or optional output devices 116. In the example shown, the input device(s) 115 (e.g., a keyboard, a mouse, a microphone, a touchscreen, and/or a keypad) and output device(s) 116 (e.g., a display, a speaker and/or a printer) are shown as optional and external to the computing system 100. In other examples, one or more of the input device(s) 115 and/or the output device(s) 116 may be included as a component of the computing system 100. In other examples, there may not be any input device(s) 115 and output device(s) 116, in which case the I/O interface(s) 104 may not be needed.

The computing system 100 may include one or more optional network interfaces 106 for wired or wireless communication with a network (e.g., an intranet, the Internet, a P2P network, a WAN and/or a LAN) or other node. The network interfaces 106 may include wired links (e.g., Ethernet cable) and/or wireless links (e.g., one or more antennas) for intra-network and/or inter-network communications.

The computing system 100 may also include one or more storage units 108, which may include a mass storage unit such as a solid state drive, a hard disk drive, a magnetic disk drive and/or an optical disk drive. The computing system 100 may include one or more memories (collectively memory 110), which may include a volatile or non-volatile memory (e.g., a flash memory, a random access memory (RAM), and/or a read-only memory (ROM)). The non-transitory memory 110 may store instructions 112 for execution by the processing device(s) 102, such as to carry out examples described in the present disclosure. The memory 110 may include other software instructions 112, such as for implementing an operating system and other applications/functions. In some examples, memory 110 may include software instructions 112 for execution by the processing device 102 to train a generative bi-modal machine learning model 200 and/or to implement a trained generative bi-modal machine learning model 200, as disclosed herein. The non-transitory memory 110 may store data, such as a data set 114 including multiple data samples. As described below, the data set 114 may include a training dataset used to train the generative bi-modal machine learning model 200, and/or data samples provided to the trained generative bi-modal machine learning model 200 for performing various generative inference tasks.

In some other examples, one or more data sets and/or modules may be provided by an external memory (e.g., an external drive in wired or wireless communication with the computing system 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 109 providing communication among components of the computing system 100, including the processing device(s) 102, I/O interface(s) 104, network interface(s) 106, storage unit(s) 108 and/or memory 110. The bus 109 may be any suitable bus architecture including, for example, a memory bus, a peripheral bus or a video bus. In some examples, the computing system 100 is a distributed computing system and the functions of the bus 109 may be performed by the network interfaces 106 in communication with communication links.

Example Generative Bi-Modal NL+NA Model

Figure 2A:
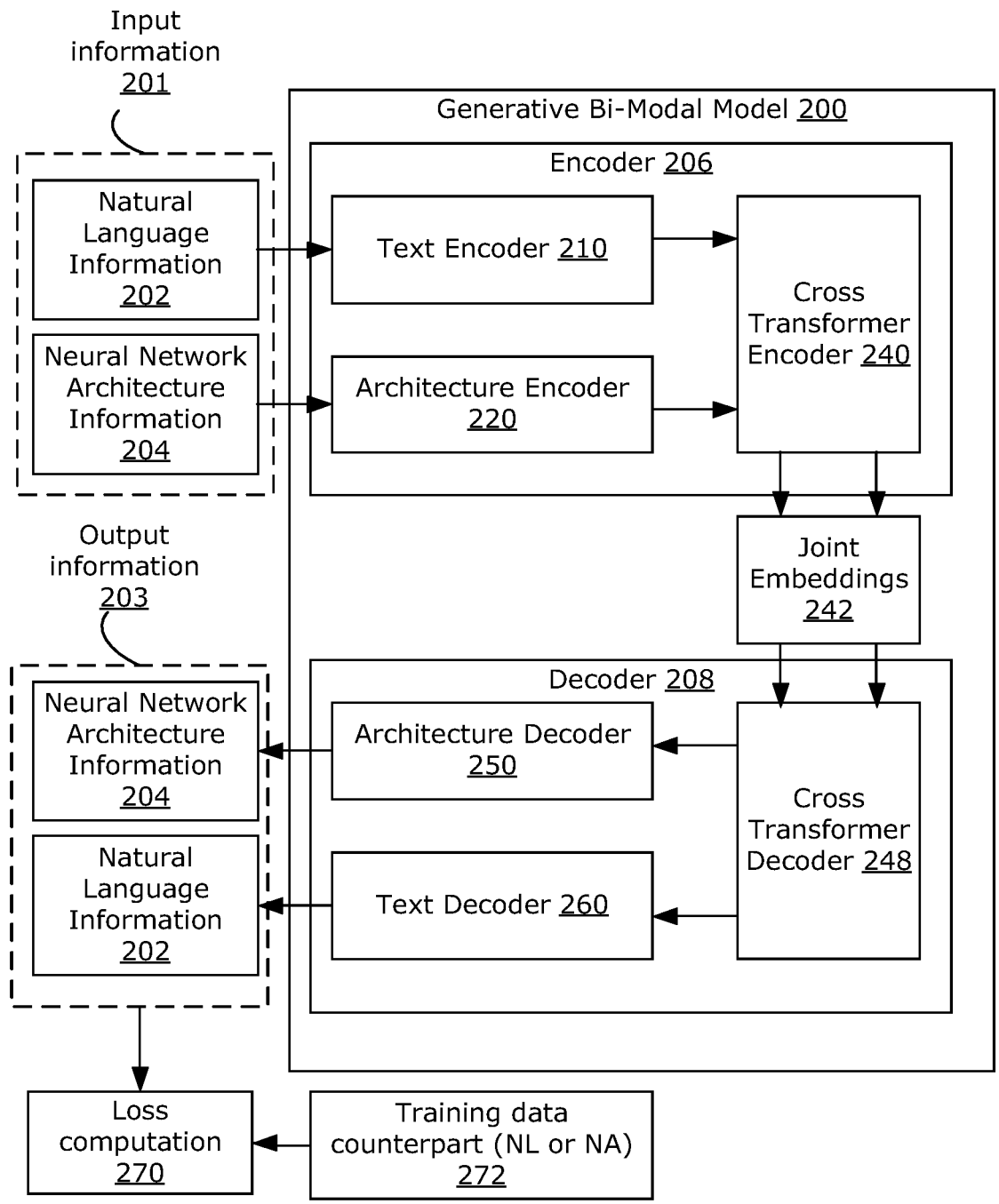
FIG. 2A is a schematic diagram of an example architecture for a generative bi-modal machine learning model trained in bi-modal generation of natural language and network architectures, in accordance with the present disclosure.

FIG. 2A illustrates an example architecture of a machine learning model trained for bi-modal generation of NL and NA, shown as generative bi-modal model 200. The illustrated generative bi-modal model 200 corresponds to the ArchGenBERT architecture. The generative bi-modal model 200 can be implemented, in various embodiments, as software instructions, hardware logic, or some combination thereof. In some examples, the generative bi-modal model 200 is implemented as software instructions tangibly stored on a non-transitory computer-readable medium, as described above with reference to the computing system 100 of FIG. 1. When executed by the processor device(s) 102 of the processing system, the instructions cause the processing system to perform the functions of the generative bi-modal model 200 as described herein.

The generative bi-modal model 200 includes an encoder 206 for receiving input information 201 (which may include NL information 202 and/or NA information 204), and a decoder 208 for generating output information 203 (which may include NL information 202 and/or NA information 204). In some embodiments, the generative bi-modal model 200 may be trained using one or more training modules, such as the loss computation module 270 shown in FIG. 2A and described below with reference to method 300 of FIG. 3.

Figure 2B:
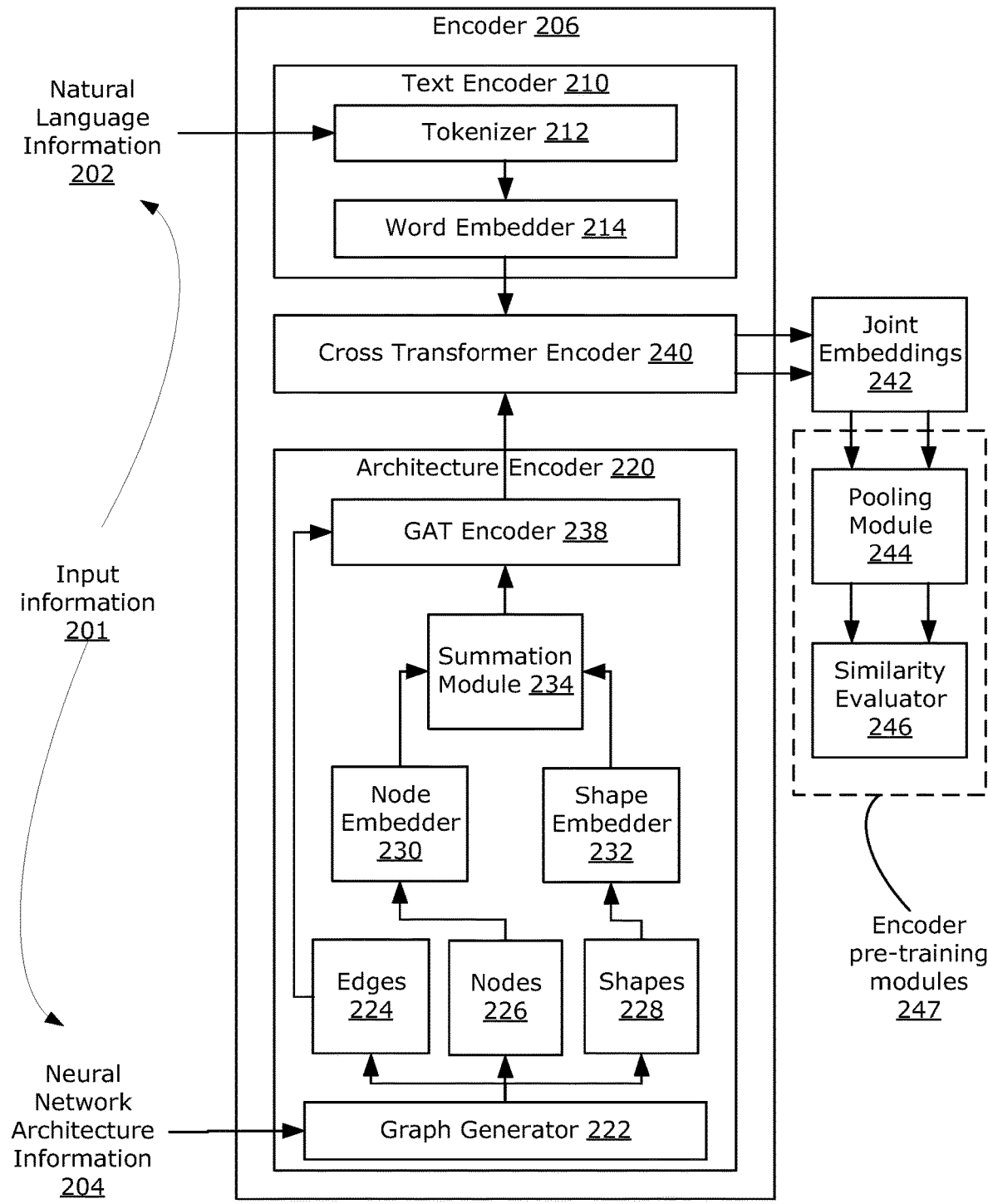
FIG. 2B is a schematic diagram of the encoder of the generative bi-modal model of FIG. 2A.

The functional modules of the encoder 206 are shown in greater detail in FIG. 2B. The functional modules of the decoder 208 are shown in greater detail in FIG. 2C. The operations of the generative bi-modal model 200 in a training mode and in an inference mode are shown in FIG. 3 and described below with reference to FIGS. 2A-2C and 3.

FIG. 2B illustrates the functional modules of an example encoder 206 of the generative bi-modal model 200. The encoder 206 includes a text encoder 210 to process natural language information 202 to generate word embeddings, a neural network architecture encoder 220 to process neural network architecture information 204 to generate graph encodings, and a cross transformer encoder 240 to process word embeddings and graph encodings to generate joint embeddings 242. In some embodiments, the encoder is pre-trained using one or more encoder pre-training modules 247, shown in FIG. 2B as a pooling module 244 and a similarity evaluator 246. Pre-training of the encoder is described below with reference to method 300 of FIG. 3.

The text encoder 210 includes a tokenizer 212 to process natural language information 202 to generate a sequence of tokens, and a word embedder 214 to process the sequence of tokens to generate word embeddings. Natural language information 202, such as a textual description, is fed to the text encoder 210 to encode and map the natural language information 202 to word representations, such as word embeddings. To do this, the text encoder 210 uses the tokenizer 212 to tokenize and split all the words in the natural language information 202. The sequence of words (i.e. tokens) is then provided to the word embedder 214 to compute the corresponding word embeddings (i.e. word representations). As used herein, a "word embedding" may refer to a real-valued vector that encodes the meaning of a word such that words that are close together in the vector space are expected to be similar in meaning.

In some embodiments, a single natural language information 202 input (i.e., a single natural language information 202 data sample) includes textual information, such as a sequence of text characters. In some examples, the natural language information 202 data sample is a textual description of a neural network architecture, a textual question, a textual answer to a question, or another form of textual information, as described in greater detail below with reference to FIGS. 4A-10.

The neural network architecture encoder 220 includes several functional modules. A graph generator 222 is used to process neural network architecture information 204 to generate a graph comprising a plurality of nodes 226, a plurality of edges 224, and a plurality of shapes 228. A shape embedder 232 processes the plurality of shapes 228 to generate shape embeddings. A node embedder 230 processes the plurality of nodes 226 to generate node embeddings. A summation module 234 sums the shape embeddings and node embeddings to generate a shape-node summation. A graph attention network (GAT) processes the shape-node summation and the plurality of edges 224 to generate a graph encoding.

The architecture encoder 220 is thus responsible for encoding the neural network architecture information 204 inputs. In some embodiments, a single neural network architecture information 204 input (i.e., a single neural network architecture information 204 data sample) encodes a single architecture of an artificial neural network. The architecture may be encoded as a computational graph (representing the neurons, layers, and neuronal interconnections of the network) and a set of hyperparameters (representing details of the operation of the network during training and/or inference). In embodiments described herein, the values of the learnable parameters of the neural network need not be included in the neural network architecture information 204. Thus, in some examples, the data representing an entire artificial neural network may include both neural network architecture information 204 defining the network's architecture, as well as all current values of the learnable parameters. The vast majority of the data representing a neural network represents the current values of the learnable parameters; the amount of data required to represent the network's architecture is typically quite small in relative terms, usually by several orders of magnitude.

In operation, the computational graph of the neural network architecture information 204 is extracted by the graph generator 222 and represented with a directed acyclic graph wherein the nodes 226 are operations (e.g., convolutions, fully-connected layers, summations, etc.) and the connectivity of the nodes 226 is described by a binary adjacency matrix consisting of edges 224. In addition to the nodes 226 and edges 224, the graph generator 222 also extracts the shapes 228 of learnable parameters associated with the nodes 226.

The nodes 226 and shapes 228 are separately encoded by the node embedder 230 and shape embedder 232, respectively. The edges 224, along with the node-shape summation generated by the summation module 234, are then provided to the GAT encoder 238 to generate the final architecture embedding, represented as a graph embedding. The GAT encoder 238 uses a Graph Attention Network (GAT) to perform the final encoding.

In operation, the cross transformer encoder 240 processes the word embeddings and graph embeddings to generate joint embeddings 242. In some examples, a cross transformer encoder 240 similar to BERT models is employed. The cross transformer encoder 240 enables joint learning of NL (e.g., textual) and NA (i.e., architectural) embeddings, in this example represented as word embeddings and graph embeddings respectively, and sharing of learning signals between both modalities. The word and graph embeddings are processed simultaneously to create their corresponding joint embeddings 242. In some examples, the joint embeddings 242 include two types of cross encoded embeddings: word embeddings cross encoded with architecture information, and graph embeddings cross encoded with natural language information, such that both cross encoded embeddings are vectors of the same length. In some examples, the two types of cross encoded embeddings of the joint embeddings may be concatenated together to form the joint embedding. In some examples, a natural language information data sample containing N number of words results in the generation of N word embeddings, and a neural network architecture information data sample containing M nodes in its computation graph results in the generation of M graph embeddings. In some such examples, the joint embeddings 242 may include N word embeddings cross encoded with architecture information, and M graph embeddings cross encoded with natural language information. In order to enable concatenation in cases where N !=M, in some examples one set of embeddings or the other may be padded with zero-padding to equalize the sizes of the two sets of embeddings.

Figure 2C:
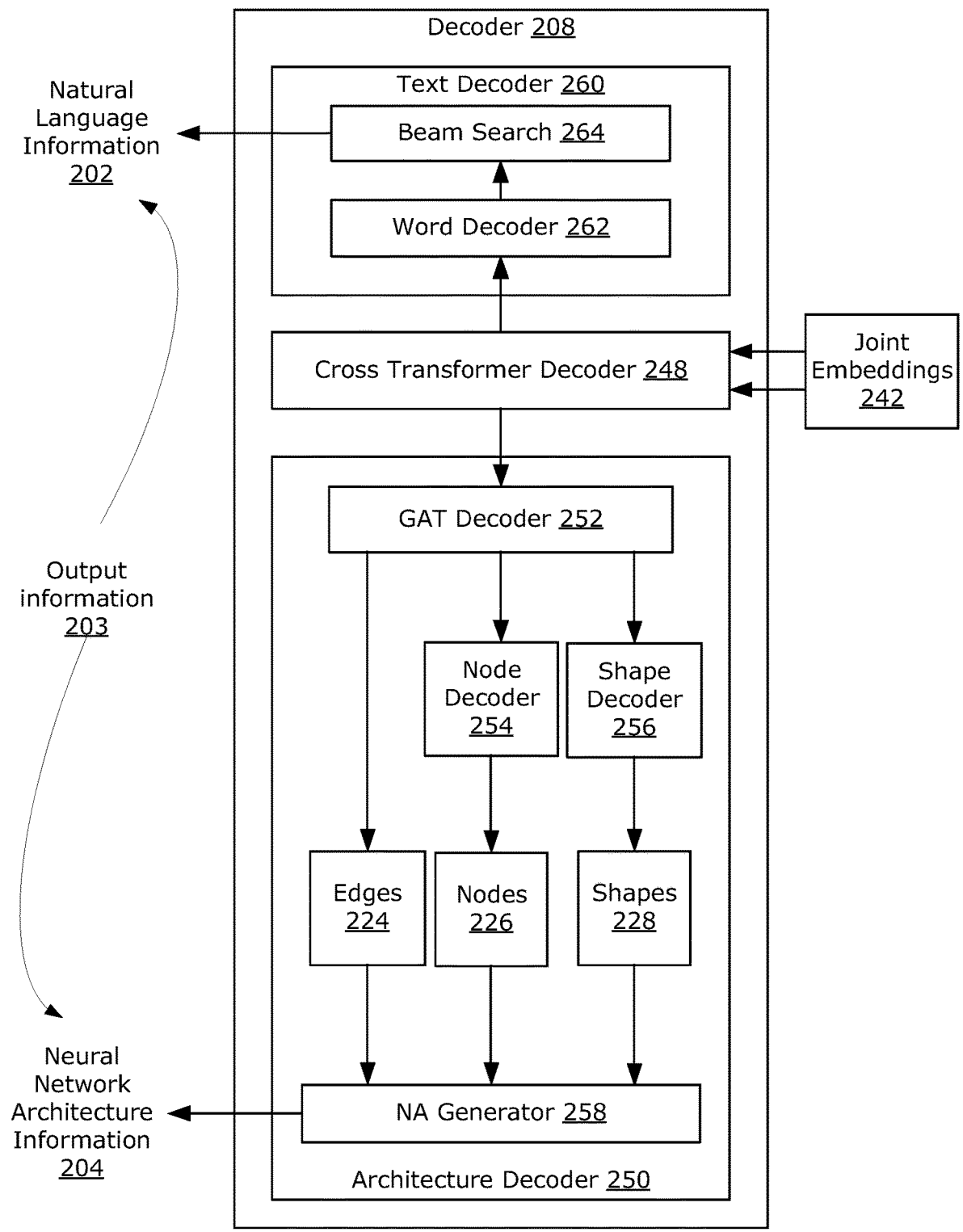
FIG. 2C is a schematic diagram of the decoder of the generative bi-modal model of FIG. 2A.
Figure 3:
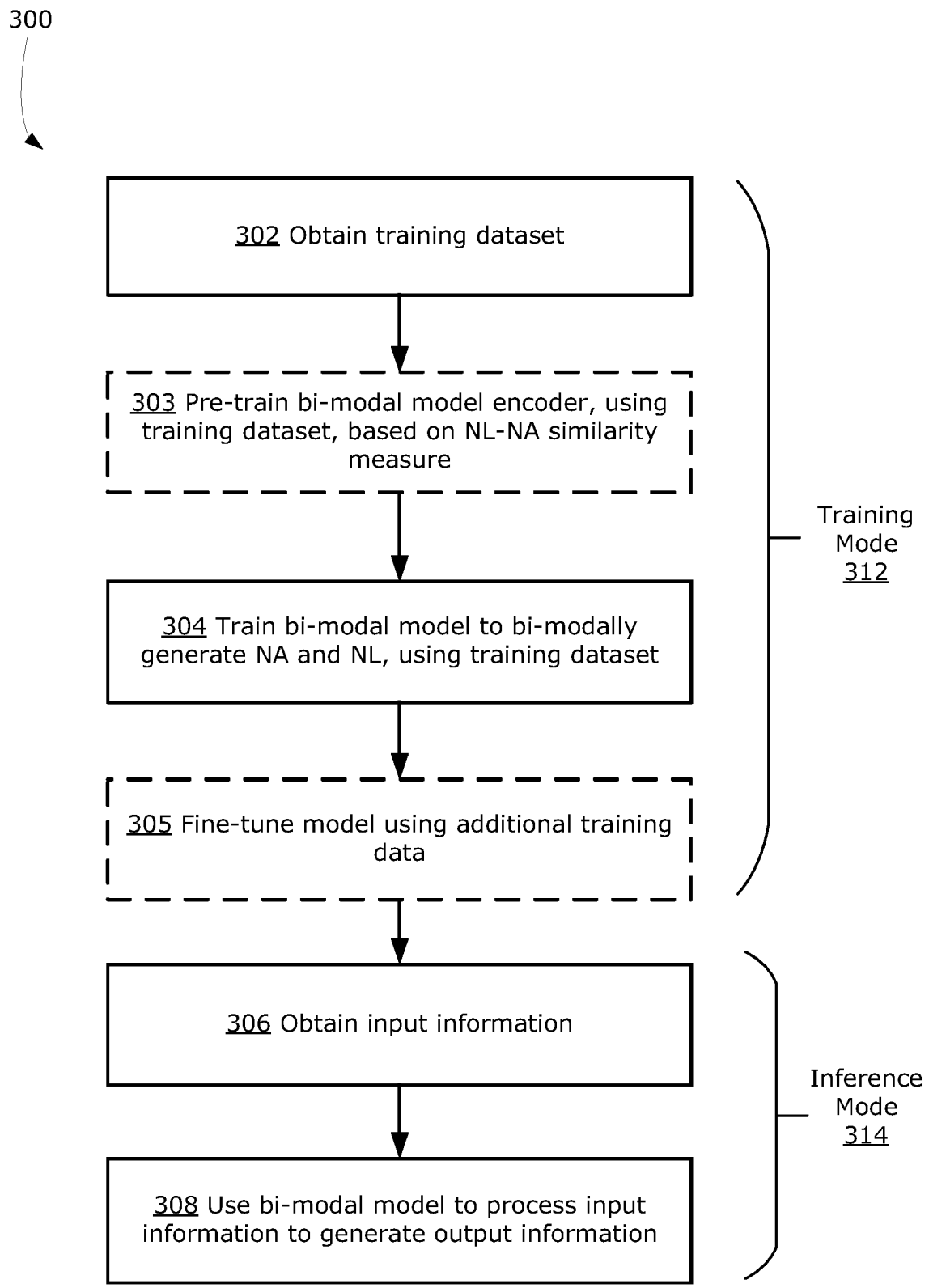
FIG. 3 is a flowchart showing operations of a method for training the generative bi-modal model of FIG. 2A in a training mode, followed by operation of the generative bi-modal model in an inference mode to perform various NL and NA generation tasks, in accordance with the present disclosure.

FIG. 2C illustrates the functional modules of an example decoder 208 of the generative bi-modal model 200. The decoder 208 may operate to perform a reverse procedure to that of the encoder 206, i.e., to decode the joint embeddings 242 into natural language information 202 and/or neural network architecture information 204. The decoder 208 includes a cross transformer decoder 248, a text decoder 260, and an architecture decoder 250. The cross transformer decoder 248 processes joint embeddings 242 to generate NL representations (e.g., word embeddings) and NA representations (e.g., graph encodings). The text decoder 260 processes the NL representations to generate NL information 202. The architecture decoder 250 processes the NA representations to generate NA information 204.

In some embodiments, the text decoder 260 includes a word decoder 262 and a beam search module 264. The word decoder 262 decodes the NL representations (e.g., word embeddings) into corresponding NL tokens to generate a sequence of linguistic tokens (e.g. words). The beam search module 264 generates the NL information 202 (e.g., text) by performing a beam search operation on the sequence of linguistic tokens, according to known beam search techniques. In general terms, the beam search operation is a variant of a greedy search algorithm that returns a list of the most likely token sequences of those generated by the word decoder 262. Instead of greedily choosing the most likely next step as the sequence of tokens of the NL information 202 is constructed, the beam search operations expands all possible next steps and keeps the k most likely sequences, wherein k is a user-specified parameter that controls the number of beams or parallel searches through the sequence of probabilities.

In some embodiments, the architecture decoder 250 includes a GAT decoder 252, a node decoder 254, a shape decoder 256, and a NA generator 258. The GAT decoder 252 processes the joint embeddings 242 to generate the edges 224 of a graph as well as node embeddings and shape embeddings. The node decoder 254 processes the node embeddings to generate nodes 226, and the shape decoder 256 processes the shape embeddings to generate shapes 228. The NA generator 258 processes the edges 224, nodes 226, and shapes 228 to generate NA information 204.

The NL information 202 and NA information 204 generated by the decoder 208 are jointly considered to be output information 203 of the generative bi-modal model 200.

In some embodiments, the encoder is pre-trained using one or more encoder pre-training modules 247, shown in FIG. 2B as a pooling module 244 and a similarity evaluator 246. Pre-training of the encoder is described below with reference to method 300 of FIG. 3.

Example Generative Bi-Modal NL+NA Training and Inference Method

FIG. 3 illustrates a flowchart showing operations of a method 300 for training the generative bi-modal model 200 in a training mode 312, followed by operation of the generative bi-modal model 200 in an inference mode 314 to perform various generative inference tasks. Optional steps are shown in dashed lines.

Examples of generative inference tasks that may be performed by the generative bi-modal model 200 are described below with reference to FIGS. 4-10. Each of these generative inference tasks may be regarded as a special case of the generative inference task operations shown in the inference mode 314 of method 300 of FIG. 3.

The operations of step 302, optional step 303, step 304, and optional step 305 constitute the training steps of the training mode 312 of method 300. In this example method 300, the generative bi-modal model 200 is trained using supervised learning. Operations 306 through 308 constitute the inference task steps of the inference mode 314 of method 300.

In order train the generative bi-modal model 200, at 302 a training dataset is obtained. The training dataset includes both positive and negative training data samples. Each positive training data sample includes neural network architecture information 204 associated with natural language information 202 descriptive of the neural network architecture information. Thus, for example, a single positive training data sample may include a computational graph and hyperparameters corresponding to a convolutional neural network with four convolution blocks and two fully-connected layers (i.e. the neural network architecture information 204), labelled with a semantic label consisting of an accurate textual description (e.g., the text "A convolutional neural network with four convolution blocks and two fully-connected layers") (the natural language information 202). An example negative training data sample may include a computational graph and hyperparameters corresponding to a recurrent neural network with six layers (i.e. the neural network architecture information 204), labelled with a semantic label consisting of inaccurate or mis-descriptive natural language information 202, i.e., text that does not describe the neural network architecture information 204. In some examples, the natural language information 202 may describe a different neural network architecture (e.g., the text "An efficient object detector with no residual layers"); in some examples, the natural language information 202 may describe something other than a neural network or may be other unrelated text.

Optionally, at step 303, the training dataset is used to pre-train the encoder 206 portion of the generative bi-modal model 200 using supervised learning. In some embodiments, such as the example encoder 206 shown in FIG. 2B, a pooling module 244 is used to pool the joint embeddings to generate encoded representations comprising fixed-size one-dimensional (1D) representations, and a similarity evaluator 246 is used for processing encoded representations to determine a similarity measure using a cosine similarity metric. During pre-training step 303, the joint embeddings 242 are pooled by the pooling module 244 to generate fixed-size one-dimensional (1D) representations. The similarities of the fixed-size 1D representations (i.e., the similarity of the fixed-size 1D NL representation to the fixed-size 1D NA representation) are then evaluated by the similarity evaluator 246, for example using a cosine similarity metric. In some examples, a fixed 1D NL representation may consist of a single embedding for all the words in a text, and may be referred to as a "text embedding" or a "sentence embedding".

The use of both positive and negative training data samples enables the encoder 206 to learn both similarities and dissimilarities between NA and NL information. In other words, during the training procedure, the encoder 206 learns to maximize the similarity measure (e.g., cosine similarity) generated between the neural network architecture information 204 and the natural language information 202 of the positive training samples, and to minimize the similarity measure generated between the neural network architecture information 204 and the natural language information 202 of the negative training samples. In some embodiments, a loss function may be computed based on the similarity measure and back-propagated through the encoder 206 to adjust the values of the learnable parameters thereof, for example using gradient descent.

In some examples, the use of an encoder pre-training step 303 may result in improved performance of the fully trained generative bi-modal model 200 relative to embodiments in which this step 303 is omitted. In some embodiments using the encoder pre-training step 303, the further training step 304 may be regarded as at least in part a fine-tuning step, and the pre-trained encoder 206 may be used as the encoder 206 of the base model trained at step 304.

At 304, the training dataset is used to train the entire generative bi-modal model 200. In some examples, step 304 uses unsupervised learning to train the entire generative bi-modal model 200. A training dataset is used to train the generative bi-modal model 200, in which each training data sample includes NA information and corresponding NL information applicable to or descriptive of the NA information. The encoder pre-training modules 247 of FIG. 2B are not used. Instead, for each training data sample, a first part of the training data sample (NL information or NA information) is processed by the generative bi-modal model 200, and the output of the decoder 208 is compared to the counterpart of the training data sample (NA information or NL information respectively) 272 to compute a loss. The loss is back-propagated through the generative bi-modal model 200 to adjust the learnable parameter values of the generative bi-modal model 200. In some embodiments, a loss computation module 270 as shown in FIG. 2A is used to apply a loss function to the training data counterpart 272 and the output information 203 to compute the loss. The loss computed by the loss computation module 270 is used to adjust the learnable parameter values of the generative bi-modal model 200, for example using gradient descent.

The training data counterpart 272 for a given data sample may be regarded as the NL information 202 and/or the NA information 204 of a given training data sample. In some examples, the generative bi-modal model 200 is trained to generate NL information 202 by providing positive training data samples as the input information 201, and computing the loss based on a comparison of the NL information 202 of the input information 201 to the NL information 202 of the output information 203. In some such examples, only the NA information 204 of the input information 201 is provided as input; in other examples, only the NL information 202 of the input information 201 is provided as input, or the entire positive training data sample (i.e., NL and NA information) is provided as input. Negative training data samples may also be used in some examples: for example, the loss computation may be based on maximizing a difference between input NL labels and NL output for negative training data samples, rather than minimizing the difference as with positive training data samples. However, in some embodiments only positive data samples are used for training. The generative bi-modal model 200 may be similarly trained to generate NA information 204 by providing positive and/or negative training data samples as the input information 201, and computing the loss based on the NA information 204 of the input information 201 and the NA information 204 of the output information 203. In some examples, the generative bi-modal model 200 may be trained to generate NL information 202 and NA information 204 in parallel, for example by providing training data samples having both NL and NA information as input information 201, and computing the loss based on both the NL and NA information of the input information 203. Thus, supervised learning may be used at step 304 to train the generative bi-modal model 200 to encode NL information 202 and/or NA information 204 (both alone and together), and to decode joint embeddings of NA and/or NL information to generate NL information 202 and/or NA information 204 (both alone and together).

In other examples, the generative bi-modal model 200 may be trained at step 304 using generative adversarial network (GAN) techniques, instead of or in addition to the supervised learning techniques described above. For example, after the encoder 206 is pre-trained at step 303, a separate copy of the pre-trained encoder 206, aided by the encoder pre-training modules 247, may be used as a discriminator to discriminate between plausible and implausible sets of output information 203 generated by the generative bi-modal model 200. An adversarial loss may be computed, using the similarity evaluator 246, by providing pairs of ground truth and generated data to the pre-trained encoder 206: for example, the encoder 206 may receive as input the NL information 202 from a positive training data sample, as well as the NA information 204 generated by the generative bi-modal model 200 based on processing the positive training data sample, and the similarity measure generated by the similarity evaluator 246 could be used to compute the adversarial loss (i.e., a measure of how similar the generated NA information is to the ground truth NL information). Similar comparisons of ground truth data to generated data, using other combinations of modalities, can also be used in some examples (e.g., comparison of ground truth NL+NA to generated NL, ground truth NL+NA to generated NA, ground truth NA to generated NL, etc.). The adversarial loss can then be used to adjust the values of the learnable parameters of the generative bi-modal model 200, for example using gradient descent. In some examples, GAN-based learning techniques may improve performance of the trained model, at the possible expense of added complexity and/or computational resources used in training.

The use of both positive and negative training data samples in some embodiments may enable the generative bi-modal model 200 to learn both similarities and dissimilarities between NA and NL information.

In some examples, the generative bi-modal model 200 may undergo further training or fine-tuning of learnable parameters values at optional step 305. At 305, additional training data may be used to perform further training of the generative bi-modal model 200, as described in greater detail below with reference to the specific generative inference tasks of FIGS. 4-10.

At 306, after the generative bi-modal model 200 has been trained, inference is performed by the trained generative bi-modal model 200, beginning with receiving input information to be used for performing the generative inference task. The input information 201 includes at least one of the two types of information understood by the generative bi-modal model: i.e., the input information 201 contains natural language information 202, neural network architecture information 204, or both. In some examples, the input information 201 includes more than one data sample of a given information type, as described in further detail in reference to FIGS. 4-10 below.

At 308, the generative bi-modal model 200 is used to process the input information 201 to generate output information 203, which may include natural language information 202, neural network architecture information 204, or both. Examples of different types of output information 203 are described below with reference to FIG. 4-10.

In some examples, an end user may supply input information 201 in order to obtain the output information 203 from the generative bi-modal model 200. For example, a user may make use of any of the generative capabilities of the generative bi-modal model 200 (such as those described below with reference to FIG. 4-10) by interacting with the generative bi-modal model 200, either on the same computing system 100 implementing the generative bi-modal model 200, or on a remote system in communication with the computing system 100 via the network interface 106.

To use the generative bi-modal model 200 for performing generative inference on input data 201, the user operates a user device (such as a mobile computing device or a desktop computer) to transmit the input information 201 to a system (such as computing system 100) comprising a model trained for bi-modal generation of natural language in relation to neural network architectures (such as the generative bi-modal model 200). The transmitted input information may be received by computing system 100 via network interface 106. As described above, the input information 201 includes at least one of the two types of information understood by the generative bi-modal model: i.e., the input information 201 contains natural language information 202, neural network architecture information 204, or both. The user device then receives the output information 203 generated by the generative bi-modal model 200 by processing the input information 201.

In the following sections of this description, various examples are described by which the trained generative bi-modal model 200 may be applied to perform various generative inference tasks.

Example of Architectural Answer Generation

Figure 4:
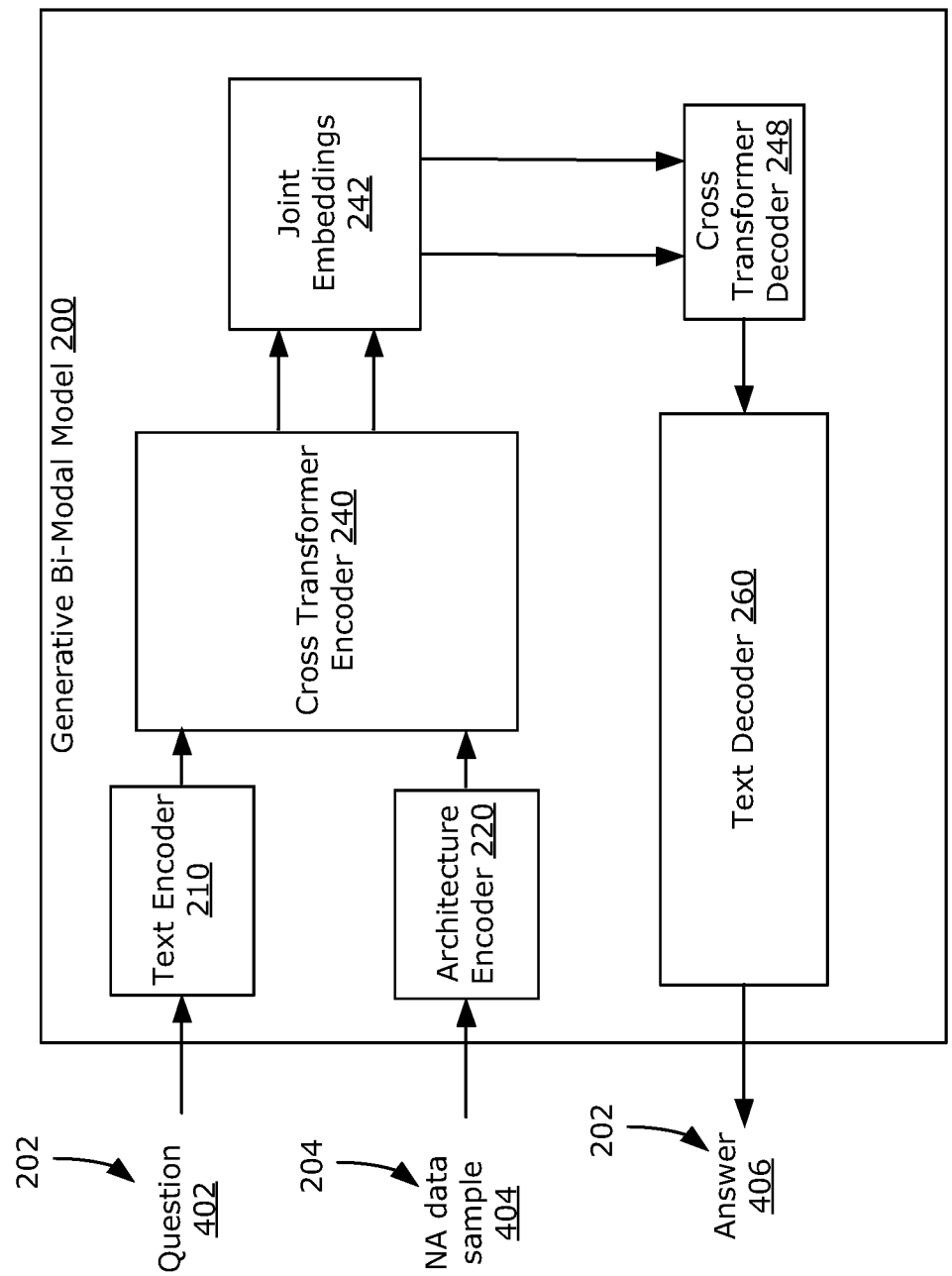
FIG. 4 is a block diagram showing operations of the generative bi-modal model of FIG. 2A to generate NL answers to NL questions about a particular NA data sample, in accordance with the present disclosure.

FIG. 4 is a block diagram showing operation of the generative bi-modal model 200 to generate NL answers to NL questions about a particular NA data sample.

The trained generative bi-modal model 200 is used to process a question 402 formatted as NL information 202, along with a NA data sample 404 formatted as NA information 204, to generate an answer 406 formatted as NL information 202. The question 402 is a question regarding the NA data sample 404. Thus, the input information 201 may include a textual question 402 (e.g., "What normalization is used?") and a neural network architecture (e.g., the computational graph structure and other NA information 204 of architecture ResNet152). The trained generative bi-modal model 200 processes this input information 201 to generate output information 203 consisting of a textual answer 406 (e.g., "Batch normalization") that is responsive to the question 402 as applied to the NA data sample 404.

In operation, the text encoder 210 processes the question 402 and the architecture encoder 220 processes the NA data sample 404. The NL encoding (e.g., word embeddings) and NA encoding (e.g., graph encoding) generated thereby are processed by the cross transformer encoder 240 to generate the joint embeddings 242. The joint embeddings 242 are processed by the cross transformer decoder 248 to generate word embeddings, which are processed by the text decoder 260 to generate the answer 406.

In some embodiments, prior to deployment to perform the answer generation task in inference mode 314, the generative bi-modal model 200 first undergoes further fine-tuning at step 305 in order to perform the answer generation task effectively. An additional training dataset is used at step 305, wherein each training data sample is a set of (question, NA data sample, answer). I.e., each training data sample includes a NL question associated with a respective NA data sample and with a NL answer to that specific question regarding the NA. The answer of a given training data sample is used as the training data label 272 when training the generative bi-modal model 200 to generate an answer based on processing the question and NA of that training data sample.

Thus, a user or querying process may use the architecture answer generation operation described above to generate natural language answers to natural language questions about a specific neural network architecture. In some examples, this may allow users to learn about the characteristics of various neural network architectures.

Example of Nl-Based NA Generation

Figure 5:
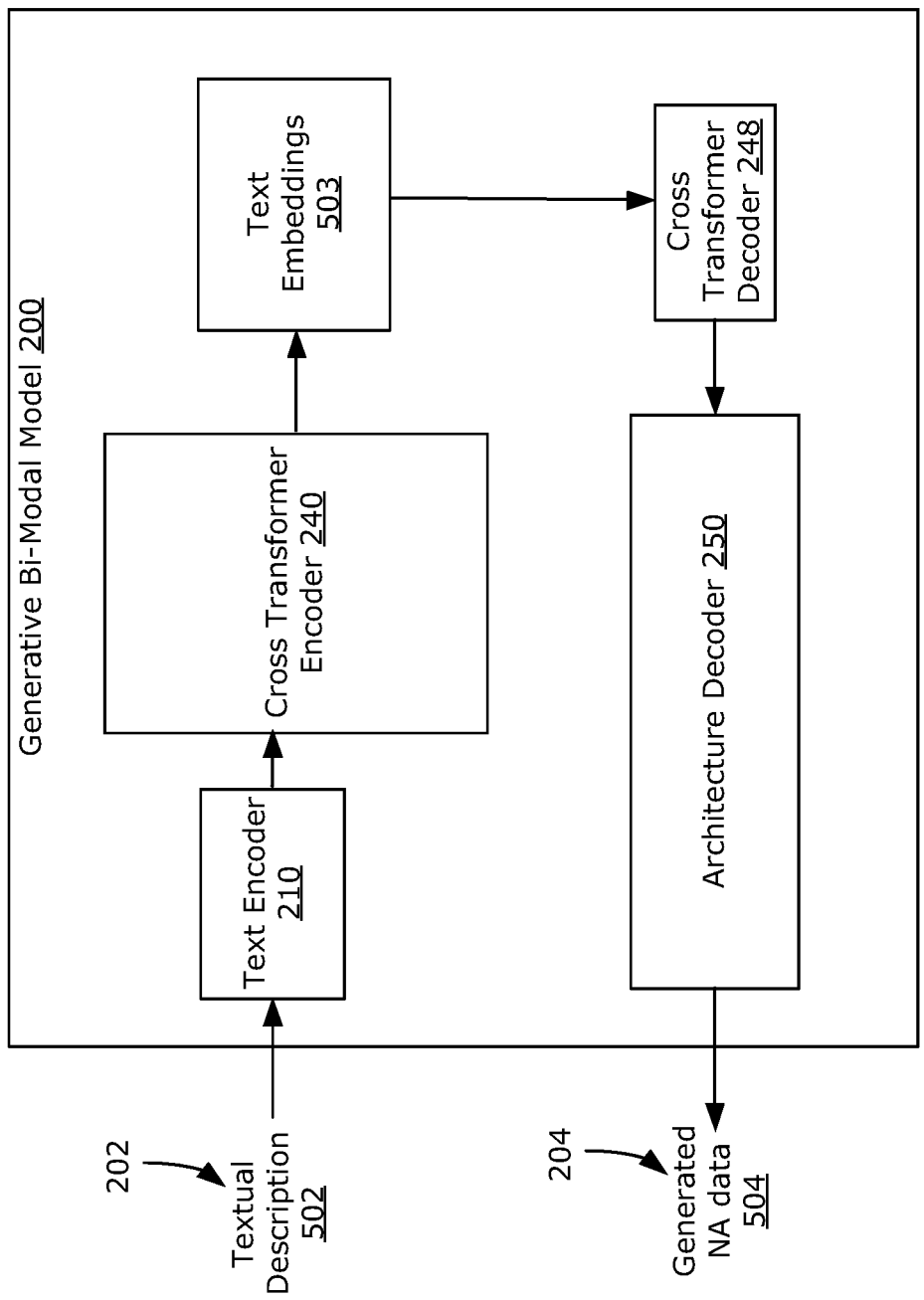
FIG. 5 is a block diagram showing operations of the generative bi-modal model of FIG. 2A to generate neural network architecture information that corresponds to natural language information, in accordance with the present disclosure.

FIG. 5 is a block diagram showing operation of the generative bi-modal model 200 to generate neural network architecture information 204 that corresponds to natural language information 202, such as a textual description 502. The input information 201 consists of a textual description 502 (i.e. natural language data 202). The textual description 502 is processed by the text encoder 210 of the trained generative bi-modal model 200, and is then cross-encoded by the cross transformer encoder 240 to generate text embeddings 503. The text embeddings 503 are processed by the cross transformer decoder 248 to generate graph encodings, which are processed by the architecture decoder 250 to generate the generated NA data 504 (formatted as neural network architecture information 204). The generated NA data 504 corresponds to a neural network architecture described by the textual description 502.

Thus, the generative bi-modal model 200 can be used to generate NA information 204 (e.g., a FastRCNN architecture) that corresponds to the textual description 502 (e.g., "An object detector with no residual layers"). A user or querying process may use the NL-based NA generation operation described above to generate a neural network architecture matching a textual description or a linguistic proposition. In some examples, this may allow users to generate a neural network architecture that satisfies desired criteria, which may assist in the design and deployment of neural networks intended for specific applications.

Example of NA-Based NL Generation (E.g., NA Captioning)

Figure 6:
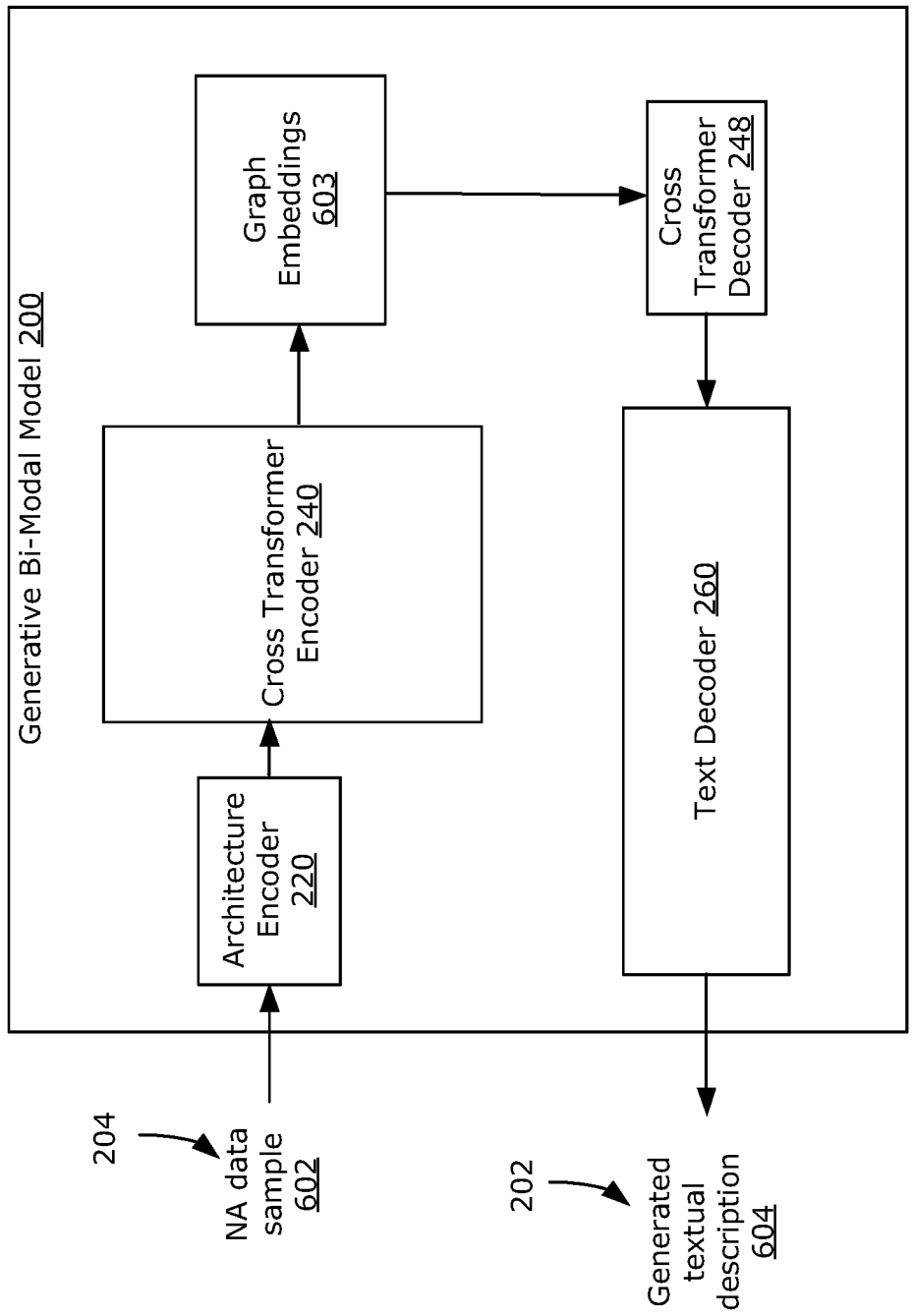
FIG. 6 is a block diagram showing operations of the generative bi-modal model of FIG. 2A to generate natural language information that corresponds to a given neural network architecture, in accordance with the present disclosure.

FIG. 6 is a block diagram showing operations of the generative bi-modal model 200 to generate natural language information 202 (such as a textual description or caption) that corresponds to, or is descriptive of, a given neural network architecture.

The trained generative bi-modal model 200 is used to process a NA data sample 602 formatted as NA information 204, corresponding to a first neural network architecture. The architecture encoder 220 processes the NA data sample 602 to generate a NA encoding (e.g., graph encoding), which is processed by the cross transformer encoder 240 to generate the graph embeddings 603. The graph embeddings 603 are processed by the cross transformer decoder 248 to generate word embeddings, which are processed by the text decoder 260 to generate the generated textual description 604 (e.g., a description or caption) that is descriptive of the first neural network architecture.

Thus, in some examples, the NL information 202 generated by the NA-based NL generation task includes a textual description 604 (e.g., "An efficient object detector with no residual layers") that describes the NA information 204 used as input (e.g., a FastRCNN architecture). In some examples, this may allow users to automatically generate captions or other descriptions to label or identify neural network architectures.

Example of NA Translation

Figure 7:
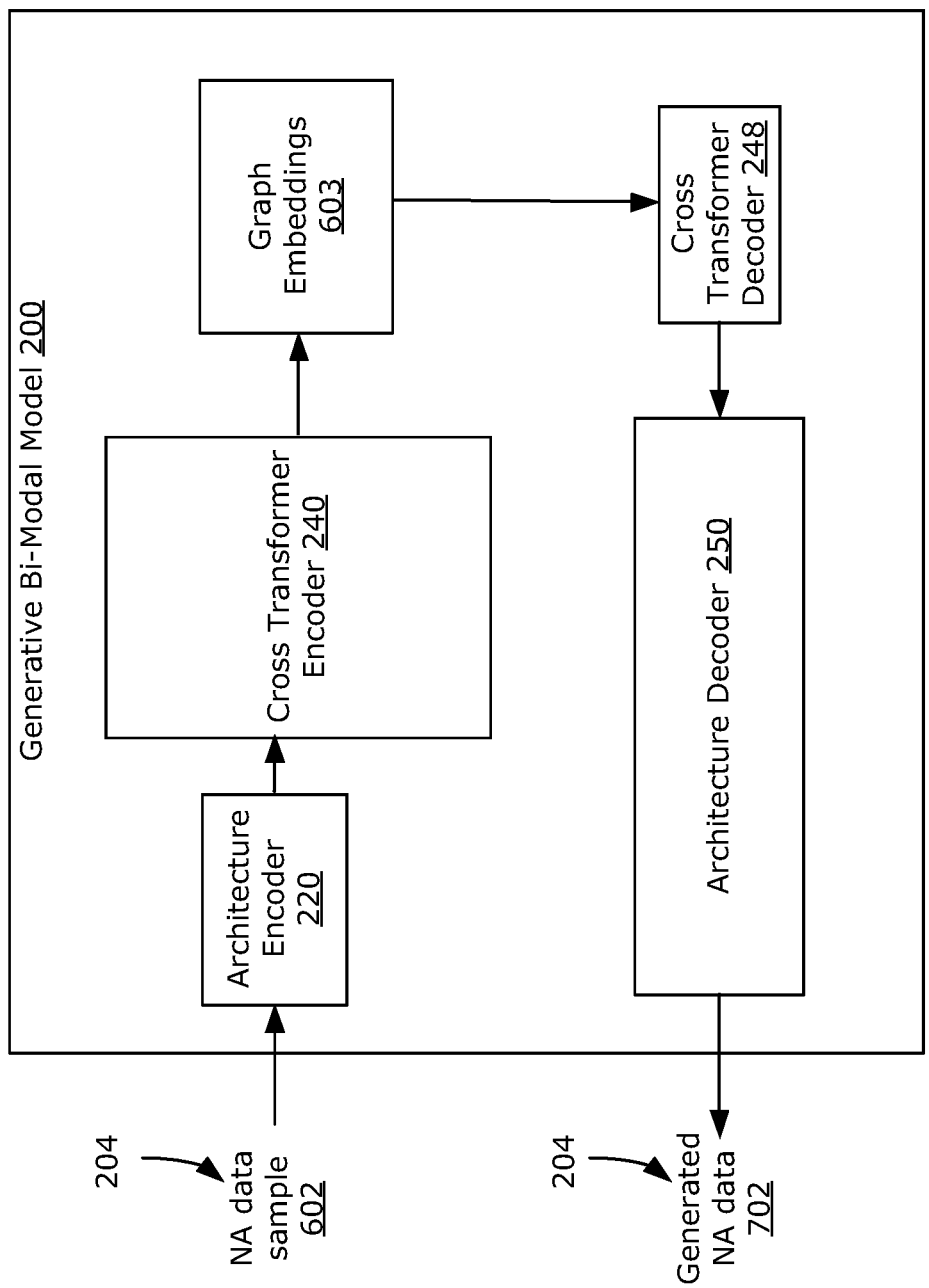
FIG. 7 is a block diagram showing operations of the generative bi-modal model of FIG. 2A to perform an architectural translation task, in accordance with the present disclosure.

FIG. 7 is a block diagram showing operations of the generative bi-modal model 200 to perform an architectural translation task. The architectural translation task translates input information 201 consisting of NA information 204 into output information 203 consisting of NA information 204, wherein the NA information of the input and output correspond to each other in some way.

In operation, the architecture encoder 220 processes the NA data sample 602 of the input data 201 to generate a NA encoding (e.g., graph encoding), which is processed by the cross transformer encoder 240 to generate the graph embeddings 603. The graph embeddings 603 are processed by the cross transformer decoder 248 to further generate graph encodings, which are processed by the architecture decoder 250 to generate the generated NA data 504 (formatted as neural network architecture information 204). The generated NA data 702 corresponds to a neural network architecture that corresponds in some way, or is somehow equivalent or similar, to the NA data sample 602 of the input data 201.

In some examples, the generative bi-modal model 200 may be trained to translate between two specific domains of NA information by performing fine-tuning step 305 using additional training data. Each training data sample in the additional training dataset consists of pairs of NA data samples associated with each other, wherein a first NA data sample of the pair is in a first domain, and a second NA data sample of the pair is in a second domain. For example, the training dataset may consist of training data samples consisting of pairs of NA data samples wherein one NA data sample is a PyTorch™-formatted NA, and the other NA data sample is a functionally-equivalent TensorFlow™-formatted NA. By fine-tuning the generative bi-modal model 200 using this additional training dataset at step 305, the generative bi-modal model 200 may be trained to translate NA information 204 between the PyTorch™ domain or format and the TensorFlow™ domain or format, or between any two other domains or formats used by the training dataset.

Thus, the generative bi-modal model 200 can be used to translate a first NA in a first domain or format into an equivalent NA in a second domain or format. In some examples, this may allow users to adapt an existing NA into a desired domain for use with a specific software platform or for a specific application.

Example of Bi-Modal NA Translation

Figure 8:
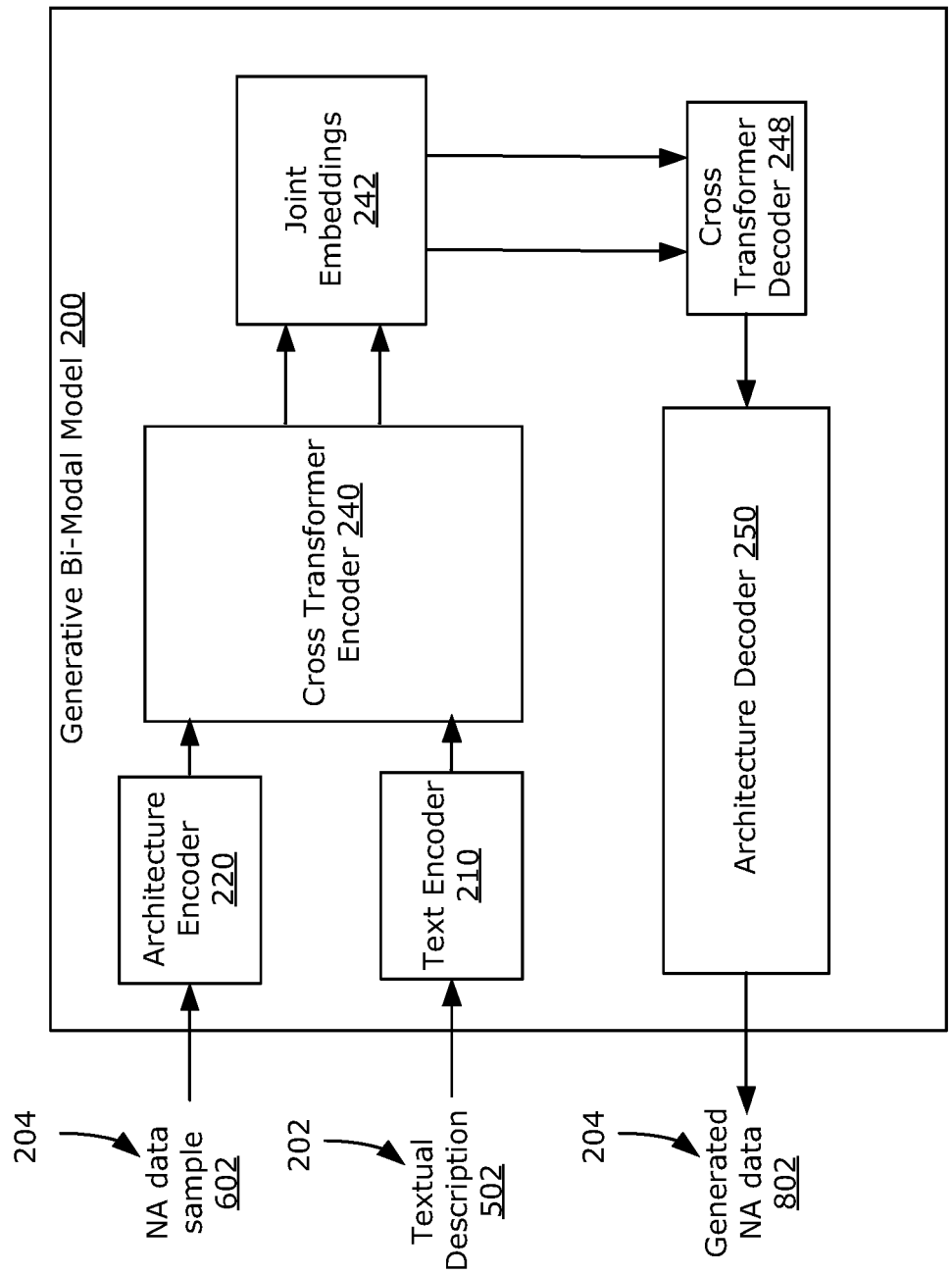
FIG. 8 is a block diagram showing operations of the generative bi-modal model of FIG. 2A to perform a bi-modal architectural translation task, in accordance with the present disclosure.

FIG. 8 is a block diagram showing operations of the generative bi-modal model 200 to perform a bi-modal architectural translation task. The bi-modal architectural translation task is similar to the architectural translation task described in the previous section (with reference to FIG. 7), except that bi-modal architectural translation also uses as input a supporting textual description 502. The textual description 502 is also encoded and cross-encoded along with the input architecture data sample 602 to generate the joint embeddings 242.

Thus, the input information 201 further comprises natural language information comprising a textual description 502. In some examples, the textual description 502 may specify what aspects of the input NA data sample 602 should be preserved in generating the generated NA data 802. For example, if the input NA data sample 602 is a PyTorch™-formatted ssd300_vgg16 architecture, and the textual description is "An efficient object detector with no residual layers", then the generative bi-modal model 200 may generate the generated NA data 802 as a TensorFlow™-formatted ssd300_vgg16 architecture. In other examples, the textual description may specify other desired characteristics of the generated NA data 802, such as the desired domain or format of the generated NA data 802.

In fine-tuning the generative bi-modal model 200 at step 305, the additional training dataset may include training data samples having, in addition to the pairs of NA data samples in the first domain and second domain, an associated textual description shared by the two NA data samples. During fine-tuning 305, the first-domain NA data sample and the textual description may be used as input information 201, with the second-domain NA data sample used as the training data label 272.

Example of NA Completion and Repair

Figure 9:
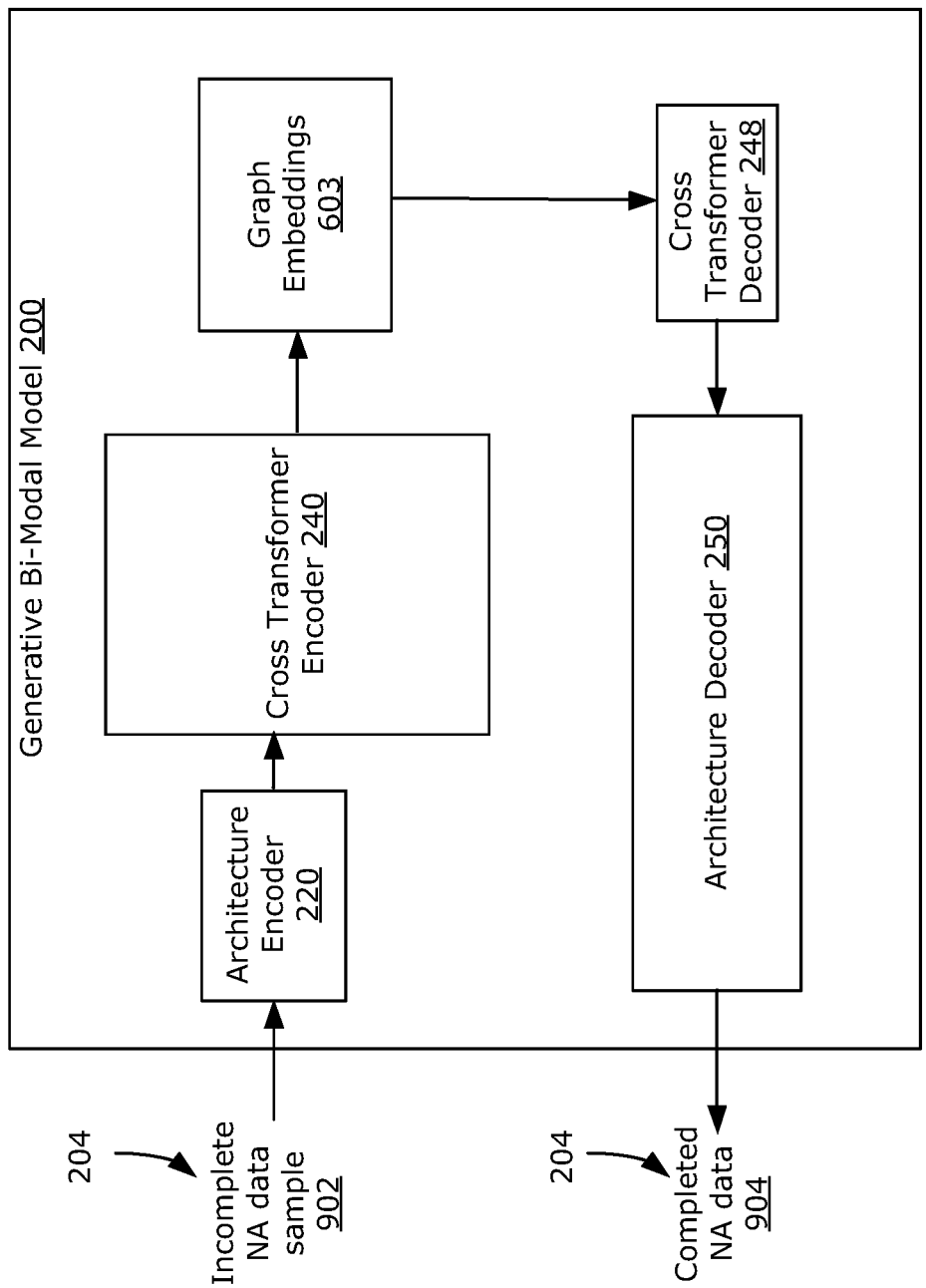
FIG. 9 is a block diagram showing operations of the generative bi-modal model of FIG. 2A to perform an architectural completion or repair task, in accordance with the present disclosure.

FIG. 9 is a block diagram showing operations of the generative bi-modal model 200 to perform an architectural completion or repair task. As used herein, the terms "repair" and completion" are used interchangeably to refer to an operation that processes a damaged or incomplete input NA to generate a complete, functional version of the input NA.

In operation, the architecture encoder 220 processes the incomplete NA data sample 902 of the input data 201 to generate a NA encoding (e.g., graph encoding), which is processed by the cross transformer encoder 240 to generate the graph embeddings 603. The graph embeddings 603 are processed by the cross transformer decoder 248 to generate graph encodings, which are processed by the architecture decoder 250 to generate the completed NA data 904 (formatted as neural network architecture information 204). The completed NA data 904 corresponds to a neural network architecture that is a complete, functional version of the NA data sample 902 of the input data 201.

In some examples, the generative bi-modal model 200 may be trained to repair or complete incomplete or damaged NA information by performing fine-tuning step 305 using additional training data. Each training data sample in the additional training dataset consists of pairs of NA data samples associated with each other, wherein a first NA data sample of the pair is incomplete or damaged (e.g., missing one or more layers or other information), and a second NA data sample of the pair is complete or functional.

Thus, a user or querying process may use the architectural completion or repair operation described above to repair or complete a damaged or incomplete network architectures.

Example of Bi-Modal NA Completion and Repair

Figure 10:
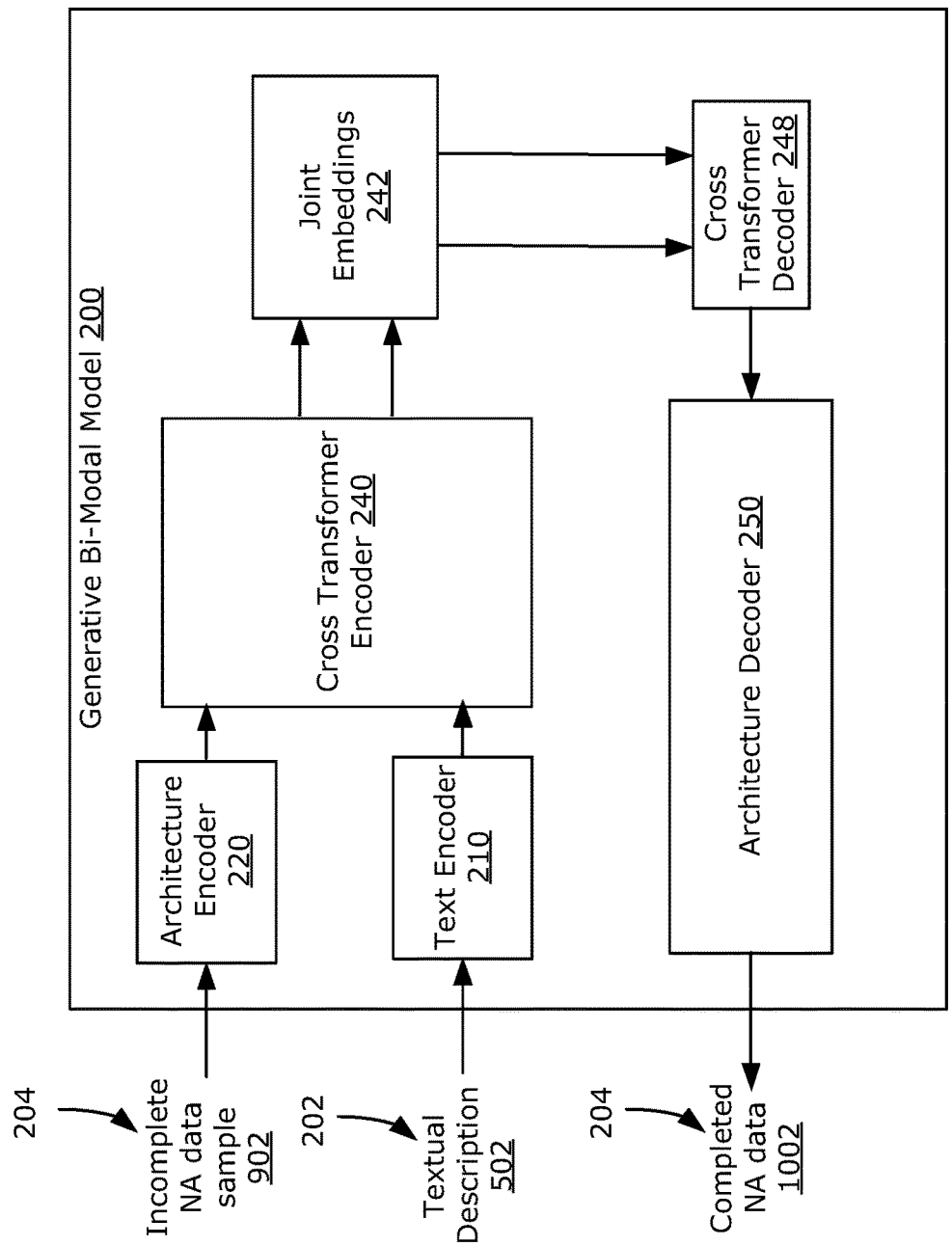
FIG. 10 is a block diagram showing operations of the generative bi-modal model of FIG. 2A to perform a bi-modal architectural completion or repair task, in accordance with the present disclosure.

FIG. 10 is a block diagram showing operations of the generative bi-modal model 200 to perform a bi-modal architectural completion or repair task. The bi-modal architectural completion or repair task combines features of the architectural completion or repair task of FIG. 9 and the bi-modal architectural translation task of FIG. 8. Like the bi-modal architectural translation task of FIG. 8, it uses a textual description 502 to supplement the incomplete NA data sample 902, which may enrich the completion procedure and/or produce more accurate results. The textual description 502 is also encoded and cross-encoded along with the input architecture data sample 602 to generate the joint embeddings 242.

As in the example of bi-modal architectural translation described above with reference to FIG. 8, the textual description 502 may specify desired aspects of the completed NA data sample 1002. For example, if the incomplete NA data sample 902 is an incomplete ssd300_vgg16 architecture missing various layers, and the textual description describes a completed ssd300_vgg16 architecture, then the generative bi-modal model 200 may generate the completed NA data 1002 as a complete ssd300_vgg16 architecture.

In fine-tuning the generative bi-modal model 200 at step 305, the additional training dataset may include training data samples having, in addition to the pairs of incomplete and complete NA data samples, an associated textual description descriptive of the complete NA data sample. During fine-tuning 305, the incomplete NA data sample and the textual description may be used as input information 201, with the complete NA data sample used as the training data label 272.

General

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The content of all published papers identified in this disclosure, are incorporated herein by reference.

The invention claimed is:

1. A method comprising:
  obtaining a generative bi-modal model trained with a bi-modal understanding of natural language in relation to neural network architectures;
  providing input information to the model, the input information comprising at least one of the following:
    natural language information; and
    neural network architecture information; and
  using the model to:
    encode the input information to generate encoded representations of the input information; and
    decode the encoded representations of the input information to generate output information comprising at least one of:
      natural language information; and
      neural network architecture information,
  wherein the input information comprises:
    natural language information comprising a question; and
    neural network architecture information corresponding to a first neural network architecture; and
  wherein the output information comprises natural language information comprising an answer responsive to the question with respect to the first neural network architecture.

2. The method of claim 1, wherein the model comprises:
  a text encoder to process natural language information to generate word embeddings;
  a neural network architecture encoder to process neural network architecture information to generate graph encodings;
  a cross transformer encoder to process word embeddings and graph encodings to generate joint embeddings;
  a cross transformer decoder to process joint embeddings to generate word embeddings and graph encodings;
  a neural network architecture decoder to process graph encodings to generate neural network architecture information; and
  a text decoder to process word embeddings to generate natural language information.

3. The method of claim 2, wherein:
  the text encoder comprises:
  a tokenizer to process natural language information to generate a sequence of tokens; and
  a word embedder to process the sequence of tokens to generate word embeddings.

4. The method of claim 2, wherein:
  the neural network architecture encoder comprises:
    a graph generator to process neural network architecture information to generate a graph comprising a plurality of nodes, a plurality of edges, and a plurality of shapes;
    a shape embedder to process the plurality of shapes to generate shape embeddings;
    a node embedder to process the plurality of nodes to generate node embeddings;
    a summation module to sum the shape embeddings and node embeddings to generate a shape-node summation; and
    a graph attention network (GAT) for processing the summation and the plurality of edges to generate a graph encoding.

5. The method of claim 2, wherein:
  the text decoder comprises:
  a word decoder to process word embeddings to generate a sequence of tokens; and
  a beam search module to process the sequence of tokens, using a beam search algorithm, to generate natural language information.

6. The method of claim 2, wherein:
  the neural network architecture decoder comprises:
  a graph attention network (GAT) decoder for processing graph encodings to generate a plurality of edges, a plurality of node embeddings, and a plurality of shape embeddings;
  a shape decoder to process the plurality of shape embeddings to generate a plurality of shapes;
  a node decoder to process the plurality of node embeddings to generate a plurality of nodes; and
    a network architecture generator to process the plurality of nodes, the plurality of edges, and the plurality of shapes to generate neural network architecture information.

7. The method of claim 1, wherein obtaining the model comprises:
  providing a training dataset comprising:
    a plurality of positive training samples, each positive training data sample comprising neural network architecture information associated with natural language information descriptive of the neural network architecture information; and
  training the model, using supervised learning, to:
  minimize a difference between the neural network architecture information and the natural language information of the positive training samples.

8. The method of claim 2, wherein:
  the model further comprises:
    a pooling module to pool the joint embeddings to generate encoded representations comprising fixed-size one-dimensional (1D) representations; and
    a similarity evaluator for processing encoded representations to determine a similarity measure using a cosine similarity metric; and
  obtaining the model comprises:
    providing a training dataset comprising:
      a plurality of positive training samples, each positive training data sample comprising neural network architecture information associated with natural language information descriptive of the neural network architecture information; and
      a plurality of negative training samples, each negative training data sample comprising neural network architecture information associated with natural language information not descriptive of the neural network architecture information; and
    pre-training the text encoder and the neural network architecture encoder of the model, using supervised learning, to:
      maximize a similarity measure generated between the neural network architecture information and the natural language information of the positive training samples; and
      minimize the similarity measure generated between the neural network architecture information and the natural language information of the negative training samples.

9. The method of claim 1, wherein obtaining the model comprises:
  providing an additional training dataset comprising a plurality of additional training samples, each additional training data sample comprising:

neural network architecture information corresponding to a neural network architecture;
a first natural language data sample corresponding to a question; and
a second natural language data sample corresponding to an answer to the question with respect to the neural network architecture of the neural network architecture information; and
fine-tuning the model, using supervised learning, to associate, for each training data sample, the second natural language data sample with the neural network architecture information and the first natural language data sample.

10. The method of claim 1, wherein:
the input information comprises natural language information comprising a textual description descriptive of a first neural network architecture; and
the output information comprises neural network architecture information corresponding to the first neural network architecture.

11. The method of claim 1, wherein:
the input information comprises neural network architecture information corresponding to a first neural network architecture; and
the output information comprises natural language information comprising a textual description descriptive of the first neural network architecture.

12. The method of claim 1, wherein:
the input information comprises neural network architecture information corresponding to a first neural network architecture in a first domain; and
the output information comprises neural network architecture information corresponding to the first neural network architecture in a second domain.

13. The method of claim 12, wherein obtaining the model comprises:
providing an additional training dataset comprising a plurality of additional training samples, each additional training data sample comprising:
a first neural network architecture information data sample corresponding to a neural network architecture in the first domain; and
a second neural network architecture information data sample corresponding to the neural network architecture in the second domain; and
fine-tuning the model, using supervised learning, to associate, for each training data sample, the second neural network architecture information data sample with the first neural network architecture information data sample.

14. The method of claim 12, wherein:
the input information further comprises natural language information comprising a textual description;
using the model to process the input information to generate the output information further comprises:
processing the natural language information, using the model, to generate an encoded representation of the natural language information; and
the output information comprises neural network architecture information that:
corresponds to the first neural network architecture in a second domain; and
is described by the textual description.

15. The method of claim 1, wherein:
the input information comprises neural network architecture information corresponding to an incomplete version of a first neural network architecture; and
the output information comprises neural network architecture information corresponding to a complete version of the first neural network architecture.

16. The method of claim 15, wherein obtaining the model comprises:
providing an additional training dataset comprising a plurality of additional training samples, each additional training data sample comprising:
a first neural network architecture information data sample corresponding to an incomplete version of a neural network architecture; and
a second neural network architecture information data sample corresponding to a complete version of the neural network architecture; and
fine-tuning the model, using supervised learning, to associate, for each training data sample, the second neural network architecture information data sample with the first neural network architecture information data sample.

17. The method of claim 15, wherein:
the input information further comprises natural language information comprising a textual description;
using the model to process the input information to generate the output information further comprises:
processing the natural language information, using the model, to generate an encoded representation of the natural language information; and
the output information comprises neural network architecture information that:
corresponds to a complete version of the first neural network architecture; and
is described by the textual description.

18. A non-transitory computer-readable medium having instructions tangibly stored thereon that, when executed by a processing system, cause the processing system to perform the method of claim 1.

* * * * *